US012175746B2

(12) United States Patent
Tham et al.

(10) Patent No.: US 12,175,746 B2
(45) Date of Patent: Dec. 24, 2024

(54) CONTROLLING IoT DEVICES THROUGH AR OBJECT INTERACTION

(71) Applicants: Yu Jiang Tham, Seattle, WA (US); Rajan Vaish, Beverly Hills, CA (US); Andrés Monroy-Hernández, Seattle, WA (US); Sven Kratz, Mercer Island, WA (US); Ana Maria Cardenas Gasca, Pasadena, CA (US)

(72) Inventors: Yu Jiang Tham, Seattle, WA (US); Rajan Vaish, Beverly Hills, CA (US); Andrés Monroy-Hernández, Seattle, WA (US); Sven Kratz, Mercer Island, WA (US); Ana Maria Cardenas Gasca, Pasadena, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/460,230

(22) Filed: Aug. 29, 2021

(65) Prior Publication Data

US 2023/0063194 A1 Mar. 2, 2023

(51) Int. Cl.
*G06V 20/20* (2022.01)
*A63F 13/216* (2014.01)
(Continued)

(52) U.S. Cl.
CPC ............ *G06V 20/20* (2022.01); *A63F 13/216* (2014.09); *A63F 13/217* (2014.09);
(Continued)

(58) Field of Classification Search
CPC ...... G06F 3/04847; G06F 3/011; G06F 3/048; G06F 3/04815; G06F 3/0482;
(Continued)

(56) References Cited

U.S. PATENT DOCUMENTS 9,459,825 B2 10/2016 Tahan
11,010,982 B1 * 5/2021 Guerra Filho .......... G06T 19/20
(Continued)

FOREIGN PATENT DOCUMENTS

WO 2021156560 A1 8/2021

OTHER PUBLICATIONS

International Search Report and Written Opinion for International Application No. PCT/US2022/039155, dated Nov. 18, 2022 (Nov. 18, 2022)—13 pages.
(Continued)

*Primary Examiner* — Jin Cheng Wang
(74) *Attorney, Agent, or Firm* — CM Law; Stephen J. Weed

(57) ABSTRACT

Systems and methods for controlling an Internet of Things (IoT) device through interaction with an augmented reality (AR) object includes pairing an AR object with an IoT device, presenting the AR object on a display of an AR camera device of a user, receiving an interaction signal indicating that the user has interacted with the AR object on the display of the AR camera device, and sending a control signal to the IoT device paired with the AR object in response to the interaction signal. A second user may request presentation of the AR object to the AR display of the AR camera device of the user when the user's AR camera device is located at particular world coordinates. Also, the control signal may be sent when a particular series of interactions with the AR object have been completed, as during game play.

17 Claims, 15 Drawing Sheets

(51) Int. Cl.
*A63F 13/217* (2014.01)
*G06F 3/04847* (2022.01)
*G06T 19/00* (2011.01)
*G16Y 40/30* (2020.01)
*H04L 67/12* (2022.01)

(52) U.S. Cl.
CPC ........ *G06F 3/04847* (2013.01); *G06T 19/006* (2013.01); *G16Y 40/30* (2020.01); *H04L 67/12* (2013.01)

(58) Field of Classification Search
CPC . G06F 9/451; G06F 9/54; G06V 20/20; A63F 13/216; A63F 13/217; G06T 19/006
See application file for complete search history.

(56) References Cited

U.S. PATENT DOCUMENTS

| | | | | |
|---|---|---|---|---|
| 11,012,814 | B2* | 5/2021 | Kim | G06Q 50/163 |
| 11,095,727 | B2* | 8/2021 | Oh | G06F 3/0488 |
| 11,170,540 | B1* | 11/2021 | Nagar | G06F 3/017 |
| 11,218,478 | B1 | 1/2022 | Buckingham et al. | |
| 11,430,196 | B2 | 8/2022 | Bhushan et al. | |
| 11,431,383 | B2 | 8/2022 | Hwang et al. | |
| 11,435,891 | B2 | 9/2022 | Lin et al. | |
| 11,470,685 | B1* | 10/2022 | Meyer | H04W 4/70 |
| 2003/0210228 | A1 | 11/2003 | Ebersole et al. | |
| 2008/0112610 | A1* | 5/2008 | Israelsen | G06T 17/00 |
| | | | | 382/154 |
| 2009/0262206 | A1* | 10/2009 | Park | H04N 23/66 |
| | | | | 348/584 |
| 2012/0109345 | A1 | 5/2012 | Gilliland | |
| 2013/0050258 | A1* | 2/2013 | Liu | G06F 3/013 |
| | | | | 345/633 |
| 2014/0012787 | A1* | 1/2014 | Zhang | G06N 5/02 |
| | | | | 901/50 |
| 2014/0129176 | A1* | 5/2014 | Ramanandan | G01P 13/02 |
| | | | | 702/141 |
| 2014/0267775 | A1* | 9/2014 | Lablans | G06T 7/246 |
| | | | | 348/169 |
| 2015/0022444 | A1 | 1/2015 | Ooi | |
| 2015/0346701 | A1 | 12/2015 | Gordon et al. | |
| 2016/0098095 | A1* | 4/2016 | Gonzalez-Banos | A63F 13/92 |
| | | | | 345/156 |
| 2016/0148433 | A1* | 5/2016 | Petrovskaya | G06T 19/006 |
| | | | | 345/633 |
| 2016/0285979 | A1 | 9/2016 | Wang et al. | |
| 2016/0335289 | A1* | 11/2016 | Andrews | G06Q 50/16 |
| 2017/0048476 | A1 | 2/2017 | Kapri et al. | |
| 2017/0089723 | A1* | 3/2017 | Heide | G01C 21/165 |
| 2017/0108838 | A1 | 4/2017 | Todeschini et al. | |
| 2017/0126525 | A1 | 5/2017 | Coates et al. | |
| 2017/0134553 | A1* | 5/2017 | Jeon | H04W 4/08 |
| 2017/0149775 | A1 | 5/2017 | Bachar et al. | |
| 2017/0171180 | A1 | 6/2017 | Britt et al. | |
| 2017/0180340 | A1 | 6/2017 | Smith et al. | |
| 2017/0220236 | A1 | 8/2017 | Kwon | |
| 2017/0337745 | A1* | 11/2017 | Martin | G01S 19/14 |
| 2018/0108147 | A1* | 4/2018 | Kim | G06T 7/246 |
| 2018/0168464 | A1* | 6/2018 | Barnett, Jr. | A61B 5/6861 |
| 2018/0285631 | A1 | 10/2018 | Murrish et al. | |
| 2018/0365898 | A1* | 12/2018 | Costa | G06F 3/011 |
| 2018/0373858 | A1* | 12/2018 | Farkash | H04W 12/63 |
| 2019/0004762 | A1 | 1/2019 | Yoshimura | G06F 16/587 |
| 2019/0088025 | A1 | 3/2019 | Tamanaha | G06F 3/0484 |
| 2019/0114061 | A1* | 4/2019 | Daniels | G06F 3/04847 |
| 2019/0129507 | A1* | 5/2019 | Fan | G01S 5/0289 |
| 2019/0129607 | A1* | 5/2019 | Saurabh | G06F 3/011 |
| 2019/0220264 | A1 | 7/2019 | Yoon | |
| 2019/0317974 | A1* | 10/2019 | Chamberlin | G06F 16/29 |
| 2019/0146442 | A1 | 11/2019 | Cirino | |
| 2019/0340819 | A1* | 11/2019 | Chandrashekarappa | G06F 9/451 |
| 2019/0342942 | A1* | 11/2019 | Deros | H04W 4/021 |
| 2019/0378476 | A1 | 12/2019 | Jeon | |
| 2019/0384389 | A1 | 12/2019 | Kim et al. | |
| 2019/0385332 | A1* | 12/2019 | Yajima | G10L 15/26 |
| 2020/0027277 | A1 | 1/2020 | Woo | |
| 2020/0029172 | A1* | 1/2020 | Kim | G06Q 50/28 |
| 2020/0099748 | A1* | 3/2020 | Cambridge | H04W 4/029 |
| 2020/0104433 | A1 | 4/2020 | Santarone et al. | |
| 2020/0162785 | A1* | 5/2020 | Gentile | G06F 13/22 |
| 2020/0165036 | A1* | 5/2020 | Squiers | A45F 3/14 |
| 2020/0175976 | A1 | 6/2020 | Rakshit et al. | |
| 2020/0195463 | A1 | 6/2020 | Johnson et al. | |
| 2020/0195518 | A1* | 6/2020 | Sugaya | G16Y 40/35 |
| 2020/0249819 | A1 | 8/2020 | Berquam et al. | |
| 2020/0310749 | A1 | 10/2020 | Miller et al. | |
| 2020/0349350 | A1* | 11/2020 | Toh | G06F 3/0346 |
| 2020/0401209 | A1* | 12/2020 | Boss | G06F 3/011 |
| 2020/0401836 | A1* | 12/2020 | Koch | G06F 16/587 |
| 2021/0010315 | A1 | 1/2021 | Honjo et al. | |
| 2021/0027538 | A1* | 1/2021 | Bleyer | H04L 67/52 |
| 2021/0078172 | A1* | 3/2021 | Cao | G05D 1/0044 |
| 2021/0129868 | A1* | 5/2021 | Nehmadi | G01C 21/26 |
| 2021/0134248 | A1* | 5/2021 | Wan | G09G 5/12 |
| 2021/0149551 | A1* | 5/2021 | Lee | G06F 3/0304 |
| 2021/0151057 | A1* | 5/2021 | Sinha | G10L 25/51 |
| 2021/0185363 | A1 | 6/2021 | Paiement et al. | |
| 2021/0287442 | A1* | 9/2021 | Ramachandra | G06F 3/017 |
| 2021/0349066 | A1 | 11/2021 | Chilla et al. | |
| 2021/0365681 | A1* | 11/2021 | Huo | G06V 20/64 |
| 2021/0383611 | A1* | 12/2021 | Kanski | G06F 3/04847 |
| 2022/0028172 | A1* | 1/2022 | Yip | H04L 65/75 |
| 2022/0051666 | A1 | 2/2022 | Bravo et al. | |
| 2022/0053291 | A1* | 2/2022 | Yip | H04W 4/029 |
| 2022/0084256 | A1* | 3/2022 | Wan | G06T 7/73 |
| 2022/0100464 | A1 | 3/2022 | Prakash et al. | |
| 2022/0165036 | A1* | 5/2022 | Daley | H04L 67/51 |
| 2022/0188545 | A1 | 6/2022 | Nagar et al. | |
| 2022/0198760 | A1* | 6/2022 | Serizawa | G06T 19/006 |
| 2022/0239523 | A1* | 7/2022 | Wespel | H04N 21/42204 |
| 2022/0300738 | A1* | 9/2022 | Hu | G06V 20/80 |
| 2022/0301230 | A1 | 9/2022 | Nagar et al. | |
| 2022/0321509 | A1* | 10/2022 | Desserrey | H04L 51/046 |
| 2022/0335096 | A1* | 10/2022 | Vadrevu | G06F 16/9538 |
| 2022/0392172 | A1* | 12/2022 | Focke | G06V 10/225 |
| 2023/0136321 | A1* | 5/2023 | Eirinberg | H04L 51/10 |
| | | | | 348/211.99 |

OTHER PUBLICATIONS

International Search Report and Written Opinion for International Application No. PCT/US2022/039161, dated Nov. 11, 2022 (Nov. 11, 2022)—12 pages.
International Search Report and Written Opinion for International Application No. PCT/US2022/039471, dated Nov. 18, 2022 (Nov. 18, 2022)—11 pages.
International Search Report and Written Opinion for International Application No. PCT/US2022/039472, dated Nov. 18, 2022 (Nov. 18, 2022)—13 pages.
Domb, Menachem. "Smart Home Systems Based on Internet of Things." Internet of Things (IoT) for Automated and Smart Applications: 25; pp. 1-13 (Year: 2019).
Sun et al., MagicHand: Interact with IoT Devices in Augmented Reality Environment, 2019 IEEE Conference on Virtual Reality and 3D User Conferences Mar. 23-27, pp. 1738-1743 (Year: 2019).

* cited by examiner

CONTROLLING IoT DEVICES THROUGH AR OBJECT INTERACTION

TECHNICAL FIELD

The present subject matter relates to systems and methods for enabling users of augmented reality (AR) cameras to interact with real-world Internet of Things (IoT) devices, and, more particularly, to systems and methods for detecting how a user interacts with AR objects presented on AR camera devices and providing an interface for commanding or responding to the IoT devices based on such user interactions.

BACKGROUND

The so-called "Internet of Things" or "IoT" is a network of physical objects that are embedded with sensors, software, and other technologies for enabling connection and exchange of data with other devices via the Internet. For example, IoT devices are used in home automation to control lighting, heating and air conditioning, media and security systems, and camera systems. A number of IoT enabled devices have been provided that function as smart home hubs to connect different smart home products. IoT devices have been used in a number of other applications as well. Application layer protocols and supporting frameworks have been provided for implementing such IoT applications. Artificial intelligence has also been combined with the Internet of Things infrastructure to achieve more efficient IoT operations, improve human-machine interactions, and enhance data management and analytics.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
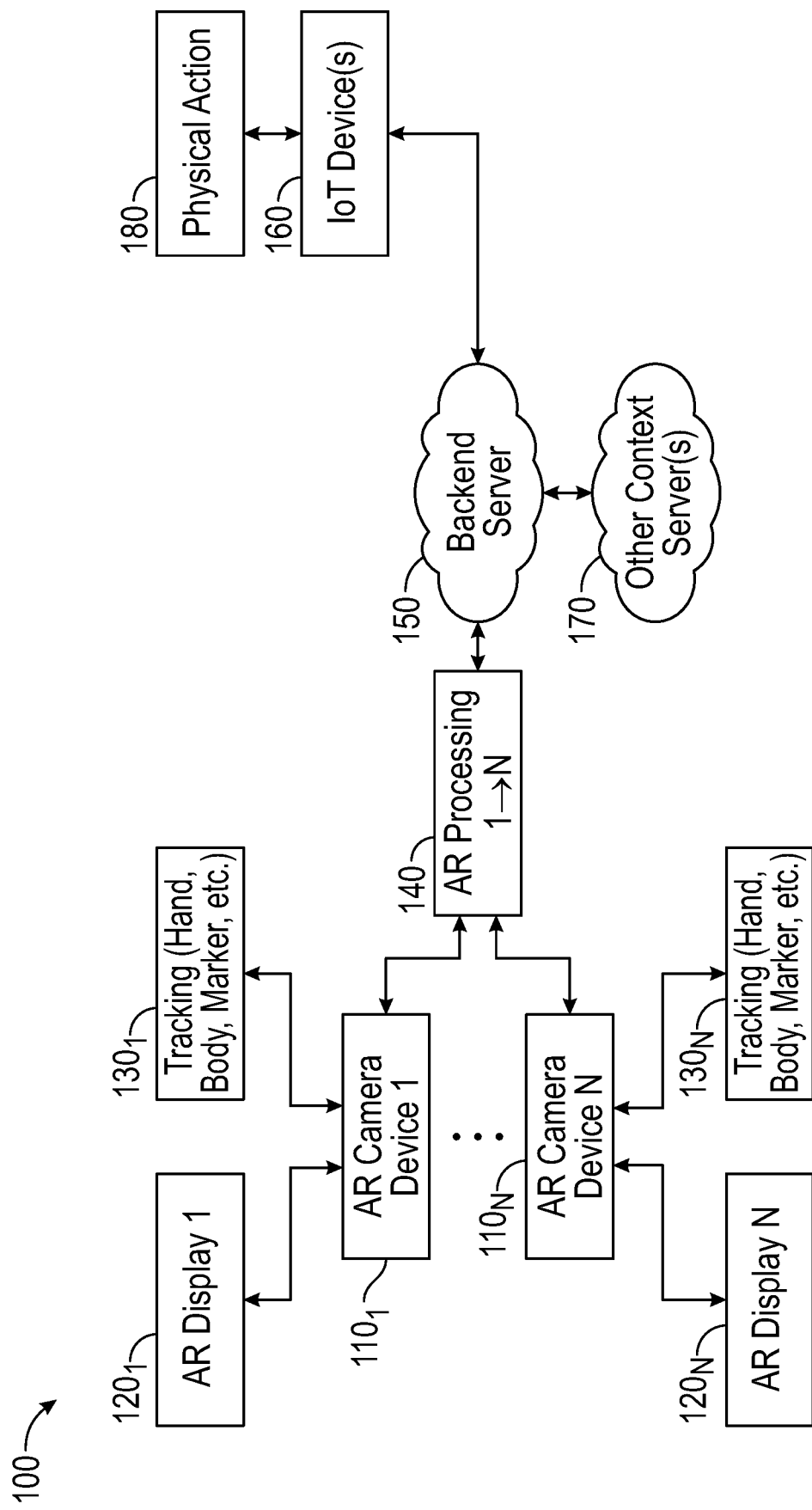
FIG. 1 illustrates a general block diagram of a system for interfacing augmented reality (AR) camera devices to Internet of Things (IoT) devices.

The systems and methods described herein pertain to utilizing augmented reality (AR) camera interfaces to affect real-world Internet of Things (IoT) objects. By utilizing a camera on various messaging or augmented reality (AR) platforms, such as SNAPCHAT® or SPECTACLES™ available from Snap, Inc. of Santa Monica, California, users may create fun and immersive ways of interacting with IoT devices. Several examples of such interactions are enabled by the disclosed systems and methods.

In a first example, IoT objects are controlled via inputs to the interface of an AR camera having object recognition capabilities. The object recognition technology may recognize that a user has performed a wave gesture at the AR camera to open and close or turn on/off IoT devices such as blinds and lamps. For example, the Snap camera available from Snap, Inc. of Santa Monica, California, would recognize that the user has opened her hand, which may be a sign to turn ON an IoT light. As another example, a user of electronic eyewear devices could point to a light and say "turn ON" or provide a further gesture such as an open hand that is interpreted to mean "turn ON." A server associated with the AR camera device would identify the light and turn it ON. However, the AR camera hardware also may be adapted to send a command directly to an IoT device without talking to the backend server. For example, near-field communication (NFC) may be used to control IoT hardware that has NFC capabilities. In this example, the AR camera device would pass control data to IoT hardware via NFC, and the IoT device would process the command. In another example, BLUETOOTH™ Low Energy communications may be used to pair the AR camera hardware with the IoT hardware (which also has BLUETOOTH™ capability). In this case, the user may be presented with an interface that allows the user to select what gestures control what aspect of the IoT hardware or pre-programmed allowed gestures may be provided in the control software.

In a second example, IoT objects are controlled via interaction with AR objects on an AR display. For example, the world position of a user may be tracked to determine whether to present an AR image to the user. In this example, a first user may place an AR door in front of his home's front door that is only displayed in a second user's messaging app or AR platform. Then, when the second user arrives at the first user's house and walks through the AR door, the real-world front door of the first user is unlocked. In another example, the user may be required to complete a task in the AR display, such as putting an AR ball in an AR box or putting an AR key in an AR lock, before the IoT device is enabled or disabled.

In a third example, a two-way interaction between IoT objects and the AR camera interface is provided. For example, an IoT sensor may detect smoke in the user's house. The AR camera interface would be instructed to display smoke (e.g., a cloudy gray AR view) in response to the detected smoke. The user may then use a gesture to push away the displayed AR smoke clouds, which would trigger IoT controlled windows in the house to open.

In a fourth example, a service is provided for building augmented reality experiences (e.g., Lens Studio by Snap, Inc.) that would permit developers to develop Lenses that control IoT devices in their environment and to permit IoT devices to provide inputs for lens selection.

In each of these examples, the system may recognize context and adjust accordingly. For example, a server associated with the AR camera device could learn from a weather app whether it is raining or sunny and turn on IoT enabled RGB light bulbs in different colors based on the weather conditions. In this example, the object recognition technology of the user's AR camera device may detect a user's hand holding up two fingers, and this data is sent to the server, which is also connected to the weather service. The weather service may inform the server that it is raining today. Based on the received data from the object recognition technology of the user's AR camera device as well as context data from the weather service, the server may then instruct two red/green/blue (RGB) light bulbs in the user's residence to turn on in blue color. On the other hand, if the user was holding up three fingers and it was sunny, then the server may instruct three RGB light bulbs in the user's residence to turn on in yellow color. In yet another example, when the user's AR camera device detects a specific image marker, the lights in the room may be changed to a specific color and a smart speaker may be instructed to play specific music, such as music based on the city the user is in at the time (as determined from GPS data or voice data inputs).

Numerous other examples will be apparent to those skilled in the art from the following descriptions.

In order to implement the examples described herein, the systems and methods described herein may utilize object recognition technology of the type implemented, for example, by Snap, Inc. of Santa Monica, California, in its Snap camera technology to detect people, body parts, or objects and how they move. For example, the object recognition technology may include a combination of computer vision, trained neural networks, and other artificial intelligence and machine learning technologies to recognize objects in the scene. The object recognition technology may also be used to detect how a user moves in relation to or interacts with AR objects. In a sample configuration, the object recognition technology of an electronic eyewear device or smartphone with an AR enabled messaging app may transmit the data it collects to a backend server, which acts as a bridge between the AR objects and other context data from any other services and physical IoT devices. The backend server also may send commands to the IoT devices to act in any number of ways in response to interactions with the AR camera device and AR objects as set forth in the examples.

The system and method described herein thus enable controlling an Internet of Things (IoT) device through interaction with an augmented reality (AR) object by pairing an AR object with an IoT device, presenting the AR object on a display of an AR camera device of a user, receiving an interaction signal indicating that the user has interacted with the AR object on the display of the AR camera device, and sending a control signal to the IoT device paired with the AR object in response to the interaction signal. A second user may request presentation of the AR object to the AR display of the AR camera device of the user when the user's AR camera device is located at particular world coordinates. Also, the control signal may be sent when a particular series of interactions with the AR object have been completed, as during game play.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying FIGS. 1-16 and discussed below.

FIG. 1 illustrates a general block diagram of a system 100 for interfacing augmented reality (AR) camera devices to Internet of Things (IoT) devices in sample configurations. As illustrated, a plurality of AR enabled camera devices $110_1$ through $110_N$, such as Snapchat cameras adapted to include a messaging app such as SNAPCHAT® available from Snap, Inc. of Santa Monica, California, include AR displays $120_1$ through $120_N$, respectively, for displaying AR objects. The AR camera devices 110 may include a smartphone, a laptop, a desktop, or any other computing device that enables communications via the internet. The AR camera devices $110_1$ through $110_N$ are further adapted to include software $130_1$ through $130_N$ to support features such as hand and body identification and tracking, marker tracking in AR space, and the like. Such features are readily available in messaging apps such as the aforementioned SNAPCHAT® messaging app.

The respective AR camera devices $110_1$ through $110_N$ may communicate with an AR processing element 140 that provides lenses and may perform object recognition and other services in sample embodiments. It will be appreciated that the object recognition and related services also may be performed by the software $130_1$ through $130_N$ running on each AR camera device $110_1$ through $110_N$ in sample configurations and that an AR processing element 140 may be provided for each AR camera device 110 in sample configurations.

As will be explained in more detail with respect to FIG. 2, the backend server 150 acts as a bridge between the AR cameras devices 110 and the physical IoT devices 160. The backend server 150 also may send commands to the IoT devices 160 to act in any number of ways as set forth in the examples described herein. The backend server 150 also may be responsive to context information provided by other context servers 170. Such context information may include time of day, weather conditions, global positioning system (GPS) data, and any other information available from third party servers.

As will be explained in more detail with respect to the example configurations described below, the IoT devices 160 may be controlled to perform desired physical actions 180 in response to user interaction with the AR camera devices $110_1$ through $110_N$ and to provide sensor outputs that initiate one or two-way interactions with the AR camera devices $110_1$ through $110_N$.

Figure 2:
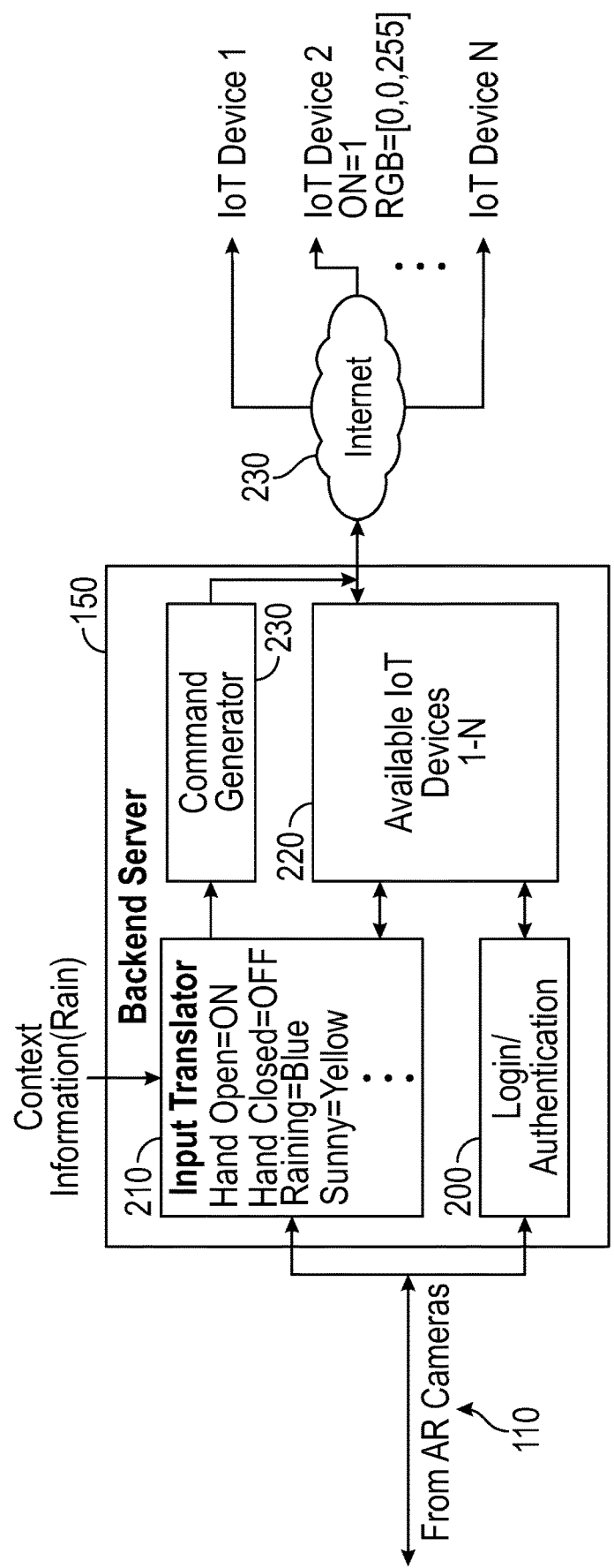
FIG. 2 illustrates a block diagram of a configuration of the backend server of the system of FIG. 1.

FIG. 2 illustrates a block diagram of a configuration of the backend server 150 of the system of FIG. 1. As illustrated, the backend server 150 receives inputs from the AR camera devices $110_1$ through $110_N$. The respective inputs are either provided to login/authentication module 200 for logging the respective users into the system or for pairing/authenticating the respective AR camera devices 110 with available IoT devices 160 having connection information stored in IoT memory 220. Once the user of an AR camera device 110 is logged into the system and the pairing function has been completed, the respective inputs from the AR camera devices $110_1$ through $110_N$ are provided to input translator 210 for determining the significance of the received inputs along with any context information from context servers 170.

In sample configurations, actions taken by the users of the AR camera devices $110_1$ through $110_N$ are provided as action identifiers that are evaluated by the input translator 210 to determine what action is to be taken by one or more paired IoT devices 160 available in the IoT memory 220. As will be described with respect to the following examples, the backend server 150 identifies the IoT device(s) 160 and the command generator 230 generates commands to be sent to the identified IoT device(s) 160 via the Internet 230 for initiating the desired action by the identified IoT device(s) 160.

In the example illustrated in FIG. 2, the AR processing 140 recognizes that the user has provided an open hand in front of the AR camera device 110 and provides this information as an action identifier to the input translator 210. The input translator 210 recognizes an open hand to mean that a designated IoT device 160 is to be turned "ON." The context information from the context server 170 is evaluated to determine characteristics of the operation of the designated IoT device 160. For example, if the IoT device 160 is a red/green/blue light source, the context information may provide information for determining which combination of red/green/blue light elements to activate. In the illustrated example, IoT device 2 is turned ON and only the blue light is activated in response to the user's open hand and an indication from a weather source 170 indicating that it is currently raining. The corresponding IoT device control signals are routed to IoT device 2 via the Internet 230.

Figure 3:
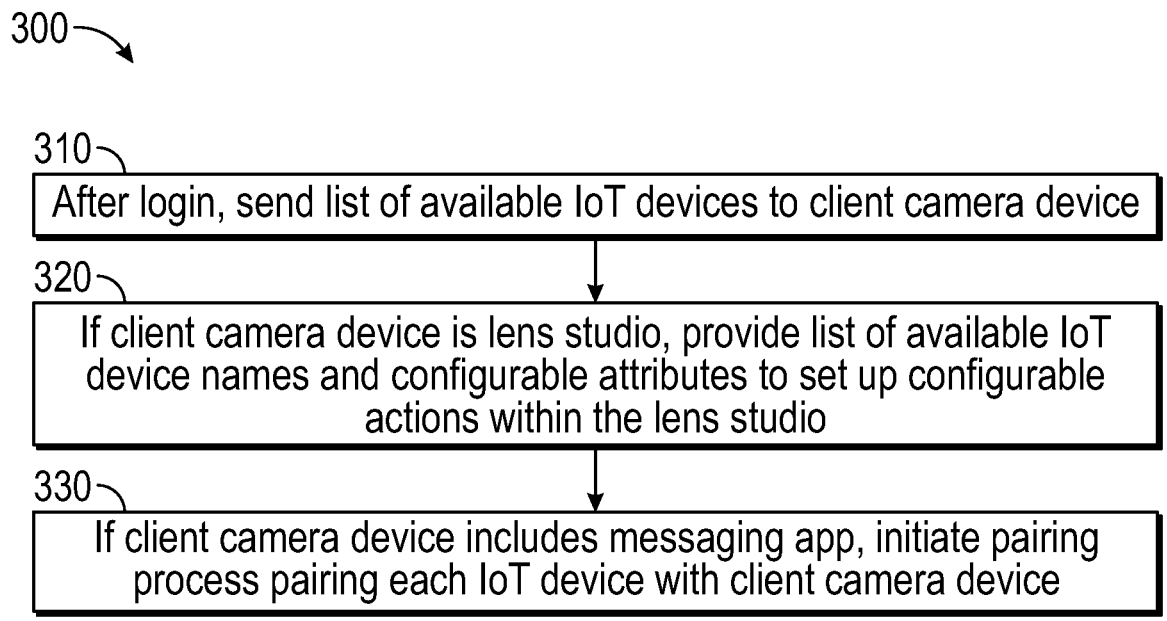
FIG. 3 illustrates a flow chart of a method for pairing an AR camera device to IoT devices.

FIG. 3 illustrates a flow chart of a method 300 for pairing an AR camera device 110 to IoT devices 160 in sample configurations. After the user logs into the backend server 150 by providing login information to login/authentication module 200, a list of available IoT devices from IoT memory 220 is provided to the AR camera device 110 for selection at 310. If the AR camera device 110 includes AR software for building AR experiences (e.g., Lens Studio by Snap, Inc., as in example of FIG. 13), a list of available IoT device names and configurable attributes are provided to the AR software at 320 to enable the user to set up configurable actions. As will be explained with respect to the example of FIG. 13, by providing this information to the AR software (e.g., Lens Studio), lenses may be paired with IoT devices 160 whereby lenses may be interacted with by the user to control IoT devices 160 and outputs of IoT devices 160 may be used to select lenses for presentation on the user's AR camera device 110. On the other hand, if the AR camera device 110 includes a messaging app such as SNAPCHAT® available from Snap, Inc. of Santa Monica, California, that provides AR functionality on a smartphone or computer, for example, a pairing process is initiated at 330 for pairing selected IoT devices 160 with AR camera device 110. The pairing process allows the user to specify which AR features of the AR camera device 110 may control which IoT devices 160 and vice-versa.

Figure 4:
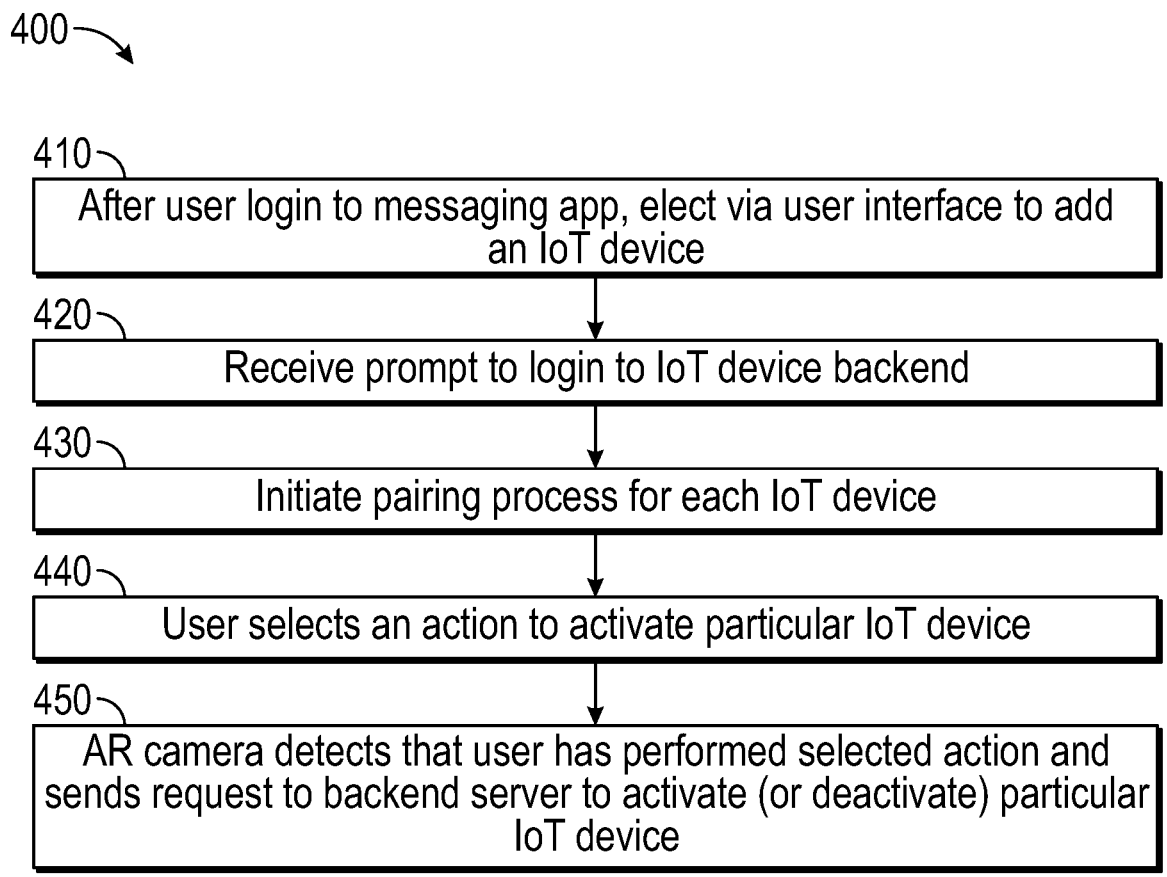
FIG. 4 illustrates a flow chart of a method for pairing a messaging app of an AR camera device to IoT devices.

FIG. 4 illustrates a flow chart of a method 400 for pairing a messaging app of an AR camera device 110 to IoT devices 160. As illustrated, after the user logs into the messaging app, the user may elect via a user interface at 410 to add an IoT device 160. The user then receives a prompt at 420 to log into the backend server 150. Upon successful login, the pairing process for each selected IoT device is initiated at 430. As part of this pairing process, the user may further select at 440 an action that is to be used to activate a particular IoT device 160. For example, in the example described above, an open hand was recognized as an indication that a corresponding IoT device 160 is to be turned ON. During use, when the AR camera device 110 detects at 450 that the user has performed the selected action (e.g., opened her hand), then a request including the corresponding action identifier is sent to the backend server 150 to activate (or deactivate in the case of a closed hand) the corresponding IoT device 160.

In sample configurations, the IoT devices 160 are paired with AR camera devices 110 via pairing means including a middleware application running in the login/authentication module 200 of the backend server 150. The middleware application assists with login/authentication of the AR camera client 110 to the IoT devices 160. After login, the middleware application sends a list of all available IoT devices 160 to the AR camera device 110. If the AR camera device 110 includes a Lens Studio, the user will receive a list of available device names and configurable attributes for the available IoT devices 160 so that the user may associate configurable actions within respective lenses. On the other hand, if the AR camera device 110 instead includes a messaging app such as SNAPCHAT®, users may go through a pairing process whereby each IoT device 160 can pair, one device at a time, with the messaging app (e.g., Snap Camera in the case of SNAPCHAT® or SPECTACLES™ available from Snap, Inc., etc.) by pointing the AR camera device 110 at the IoT device 160 in the user's environment, which will be activated one at a time via some visual (e.g., blinking a bulb), auditory (e.g., playing a sound), or other cue. The AR camera device 110 will know the current GPS coordinates, general visual features in the scene, and information from the accelerometer and will show a confirmation dialog for each paired IoT object 160.

When the user logs in to her messaging app account, the user may select an IoT device 160 by tapping on the user interface of the messaging app on the AR camera device 110. The user also may receive a prompt to log in to her IoT device backend server 150 to initiate the pairing process for each IoT device 160. Once paired, the user is able to select an action to activate the paired IoT device 160. For example:

Open hand=turn on light
Hand holding up 2 fingers=2 RGBs lights turn on with blue color
Hand holding up 3 fingers=3 RGB lights turn on with yellow color
Recognize marker=unlock door
During use, the paired IoT device 160 is activated when the user performs the corresponding action that was selected during the pairing process.

Figure 5:
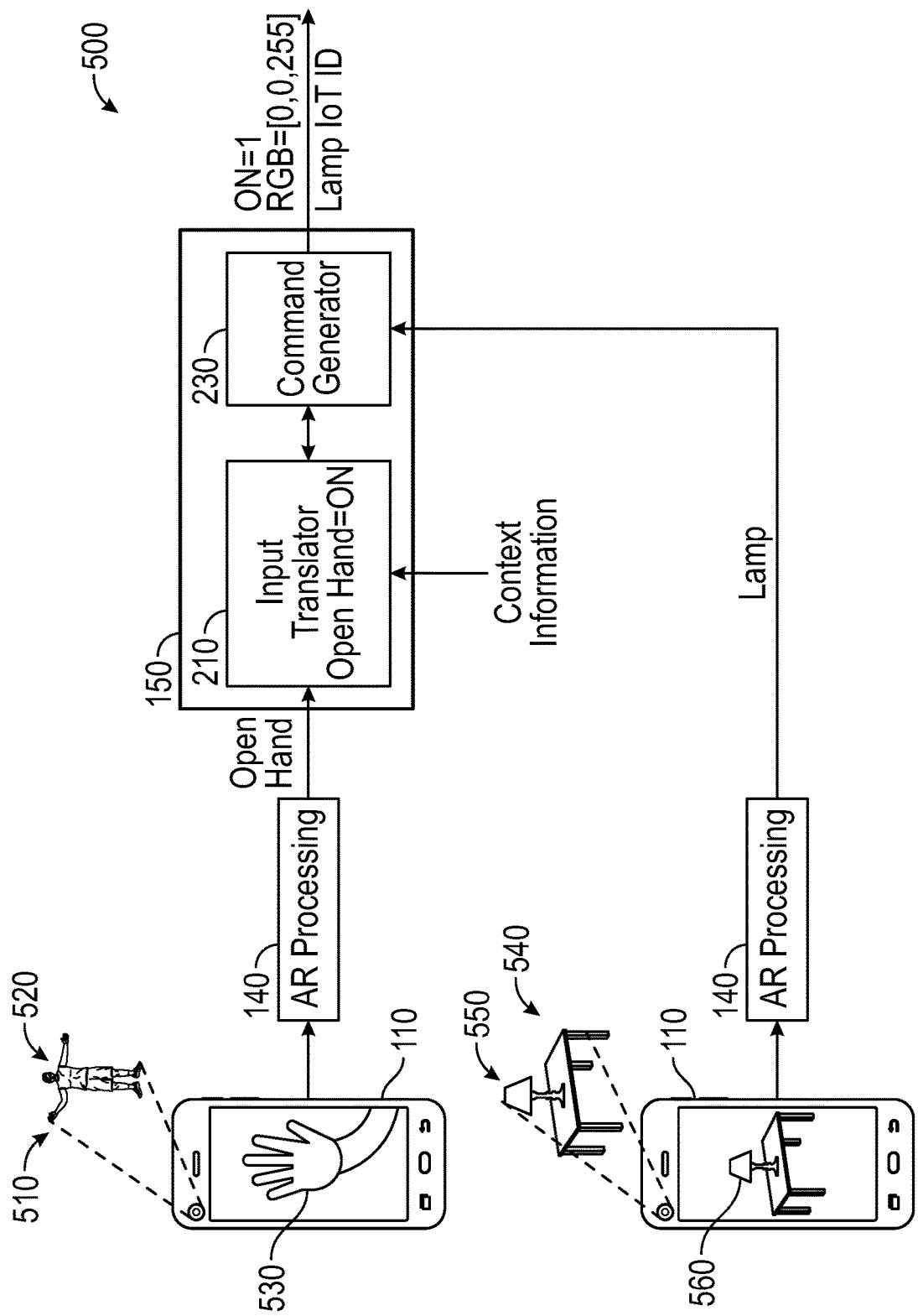
FIG. 5 illustrates a system for enabling a user of an AR camera device to control IoT devices in a sample configuration.

Different examples of implementations of the system and method will now be described with respect to FIGS. 5-15.
One-Way Control of IoT Device Using AR Camera FIG. 5 illustrates a system 500 for enabling a user of an AR camera device 110 to control IoT devices 160 in a sample configuration. In this example, the user's AR camera device 110 captures an image of the hand 510 of an individual 520 (e.g., the user) that is captured and displayed as image 530 on the user's AR camera device 110. The captured image 530 is processed by AR processing 140 to establish that the captured image is a hand and that it is open. A message including an action identifier indicating that an open hand has been received is provided to the input translator 210 of the backend server 150, which determines from its translation tables that an open hand corresponds to an "ON" command.

The IoT device 160 to be controlled by the "ON" command may be determined in a number of ways. For example, the AR camera device 110 may detect an IoT object such as a lamp 550 in the local surroundings and determine the IoT identity of lamp 550 from context information (e.g., GPS location data). The user's AR camera device 110 also may scan the scene 540 to identify the lamp 550 and display an image of the captured lamp 550 as image 560 on a display of the user's AR camera device 110. The captured image is processed by AR processing 140 to establish that the captured image 550 is a lamp having a known IoT identification. The IoT identification of the lamp is provided to the backend server 150 to determine if the identified lamp is an available IoT device for the user. If so, the "ON" signal is matched to the identified lamp as being provided contemporaneously from the same AR camera device 110.

In this example, the AR camera device 110 recognizes that the user has opened her hand, which may be a sign to turn ON the lamp 550 in the vicinity of the user. Similarly, the AR camera device 110 may recognize that the user has closed her hand, which may be a sign to turn OFF the lamp 550. The AR camera device 110 may also recognize that the hand is being waived at a particular rate and provide a corresponding rate signal for controlling an IoT enabled device such as a ceiling fan. In this example, as the rate of the hand waiving is increased or decreased, the speed of the ceiling fan is correspondingly increased or decreased.

As another example, instead of searching for an image of an open or closed hand, the AR camera device 110 may detect that a user has provided a verbal message to the AR camera device 110 such as "turn ON" or a particular gesture that is interpreted by the input translator 210 to mean "ON." Also, the AR camera device 110 could be pointed at a light in the room along with the verbal message or gesture. If the light in the room is recognized by the AR processing system 140 and backend server 150 as an IoT device 160 to which the user's AR camera device 110 has been paired, the backend server 150 would recognize the light and turn it ON in response to the verbal message or the gesture. Upon such verification, the backend server 150 could instruct the lamp to flash to verify to the user that the lamp has been recognized as the IoT device to be controlled.

As in the example described with respect to FIG. 2, the backend server 150 may receive context information from a context server 170 and adjust the response accordingly. For example, the backend server 150 may receive context information from a weather app indicating whether it is raining or sunny and turn on RGB light bulbs in different colors based on the weather conditions. If the weather app indicates that it is raining, only the blue light of the RGB light bulb may be turned ON. In this example, the backend server 150 would send an ON=1 and RGB=[0,0,255] signal to the internet address of the identified lamp IoT device. Similarly, if the weather app indicates that it is sunny, all bulbs of the RGB light bulb may be turned ON. In this example, the backend server 150 would send an ON=1 and RGB=[255,255,255] signal to the internet address of the identified lamp IoT device.

Similarly, the object recognition technology of the AR processing 140 may detect that the user's hand is holding up two fingers. This data may be sent to the backend server 150, which is also connected to a weather service. The weather service may inform the backend server 150 that it is raining today. Based on the received data from the AR processing 140 as well as context data from the weather service, the backend server 150 may then instruct two IoT enabled red/green/blue (RGB) light bulbs in the user's residence to turn on in blue color. On the other hand, if the user was holding up three fingers and it was sunny, then the backend server 150 may instruct three IoT enabled RGB light bulbs in the user's residence to turn on in yellow color.

In yet another example, when the user's AR device 110 and object recognition technology of the AR processing 140 together detect a specific image marker in the scene 540, any IoT enabled lights in the room or within a specified geographic radius may be changed to a specific color and an IoT enabled "smart" speaker may be instructed to play specific music, such as music based on the city the user is in at the time (as determined from GPS information provided by the user's AR camera device 110 or a context server 170). The same approach may be used to enable or disable or otherwise control any other types of IoT enabled devices in the vicinity of the image marker. For example, the user may be wearing AR enabled eyewear such as SPECTACLES™ available from Snap, Inc. of Santa Monica, California, and may scan a room to recognize IoT enabled devices in the room. The recognized IoT enabled devices may be turned ON automatically once recognized. Conversely, the user may say "turn ON" or provide a corresponding gesture once an IoT enabled device 160 is recognized and displayed on the AR enabled eyewear as an available IoT enabled device 160. If several IoT devices 160 are identified in the room scan, the recognized IoT devices 160 may be presented to the display of the AR enabled eyewear for selection to turn ON or OFF.

Figure 6:
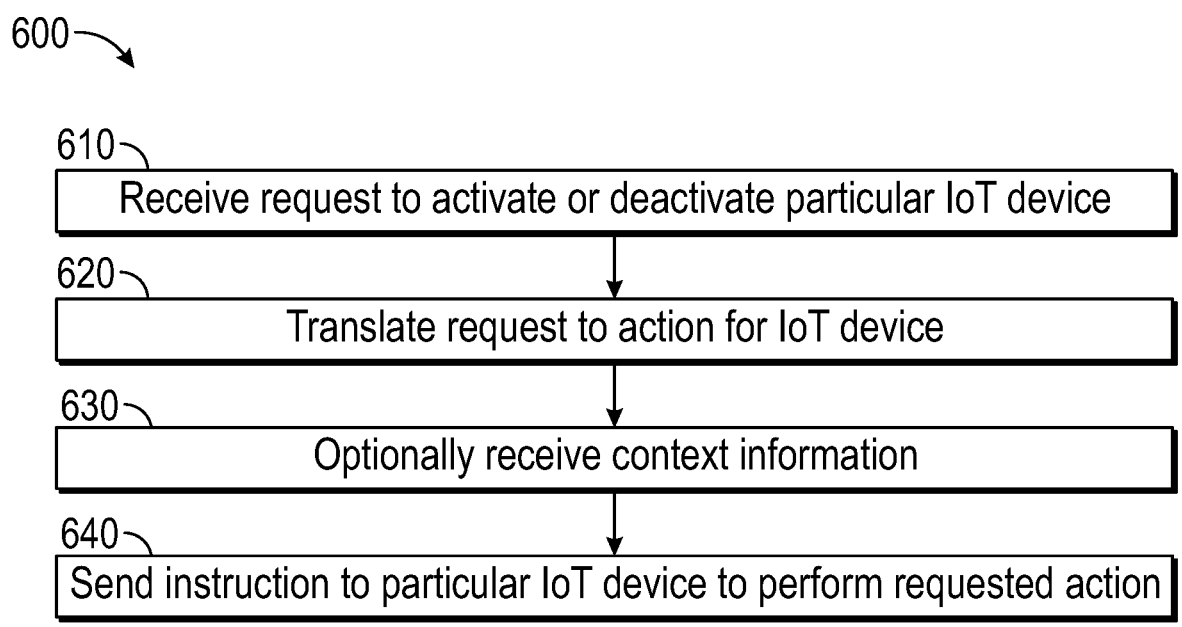
FIG. 6 illustrates a flow chart of a method implemented by the backend server for enabling a user of an AR camera device to control IoT devices in the configuration of FIG. 5.

FIG. 6 illustrates a flow chart of a method 600 implemented by the backend server 150 for enabling a user of an AR camera device 110 to control IoT devices 160 in the configuration of FIG. 5. In this configuration, the backend server 150 receives a request at 610 to activate or deactivate particular IoT devices 160 in accordance with an action identifier identifying the action recognized by the AR camera device 110. As noted above, the particular IoT device(s) 160 may be determined by scanning the room to identify IoT devices 160, pointing to and identifying a particular IoT device 160, pairing the AR camera device 160 to a particular IoT device 160, etc. The action identifier may be determined by capturing and processing the user's voice, by recognizing particular gestures, and the like. At 620, the received request including the action identifier is translated to a recognized action for the IoT device(s) 160 by the input translator 210. At 630, the backend server 630 optionally receives context information from one or more context servers 170 that may be used to modify the action for the IoT device(s) 160. At 640, the instruction for the requested action is sent to the particular IoT device(s) 160 to perform the requested action. In the example of FIGS. 2 and 5, a signal of ON=1 and RGB=[0,0,255] is sent to the IoT enabled lamp at the address provided by IoT device memory 220.

One-Way Control of IoT Device Through Interaction with AR Images

Figure 7:
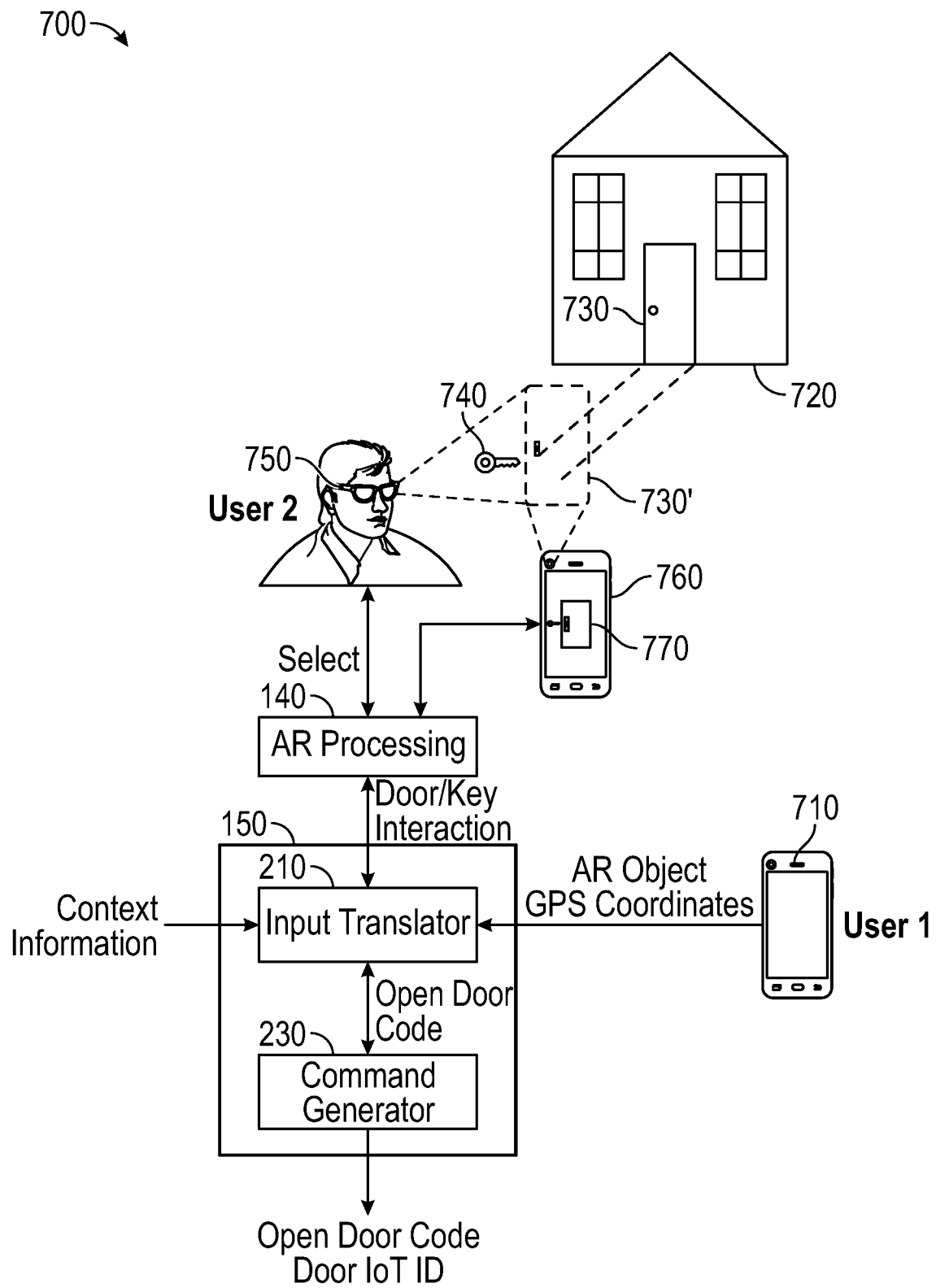
FIG. 7 illustrates a system for enabling a user to provide an AR object to another user for providing control of a real-world IoT device in a sample configuration.

FIG. 7 illustrates a system 700 for enabling a user to provide an AR object to another user for providing control of a real-world IoT device 160 in a sample configuration. In this example, IoT objects 160 are controlled via interaction with AR objects on an AR display of the AR camera device 110. For example, in the configuration of FIG. 7, the world position of a user may be tracked to determine whether to present an AR image to the user. In this example, a first user may use her AR camera device 710 to generate an AR object such as an AR door 730' that is placed in front of the front door 730 of her home 720 using global positioning system (GPS) coordinates. The GPS coordinates and the generated AR door 730' are provided to the backend server 150 to forward to a second user specified by the first user. For example, the first user may generate an AR door 730' or an AR key 740 that are placed in GPS coordinates in front of the door 730 of the first user's home 720. At least one of the AR door 730' or the key 740 are provided by the backend server 150 to the AR processing 140 that, in turn, provides an overlay image 770 of least one of the AR door 730' or the key 740 to at least one of the second user's AR eyewear 750 or AR camera device 760 for display in the second user's messaging app or AR platform. Then, when the second user arrives at the first user's house 720 and walks through the AR door 730' or interacts with the AR key 740, an interaction signal is provided to the backend server 150, where the input translator 210 recognizes the interaction and sends a control signal corresponding to the interaction (e.g., an open door code) to the internet address of the real-world IoT enabled front door 730 of the first user's house 720.

Interaction with the virtual objects overlaid on the display of an AR camera of AR camera device 110 may come in a number of forms. In the example of FIG. 7, the AR door 730' and AR key 740 may be presented on the second user's AR camera display only once the user arrives at the GPS coordinates specified by the first user. The second user may then walk through the AR door 730' or touch the AR key 740 to send a trigger message to the backend server 150 to open the door 730. On the other hand, completion of a specific action on the virtual objects may be required to send a message to the backend server 150 through the middleware that instructs a designated IoT enabled device to act in a specific way. For example, the second user may be instructed to put the AR key 740 in the AR door 730' to open the real-world IoT enabled front door 730.

In yet another example, the second user may be asked to place a virtual ball into a virtual box to turn ON an IoT enabled device 160 and to remove the virtual ball from the virtual box to turn Off the IoT enabled device 160. Also, game play in the virtual environment may provide the reward of activating an IoT enabled real-world object when designated activities have been completed. In this example, a quest in the virtual environment may be rewarded by turning on an IoT enabled machine, unlocking a door, etc., upon completion of the quest.

Figure 8:
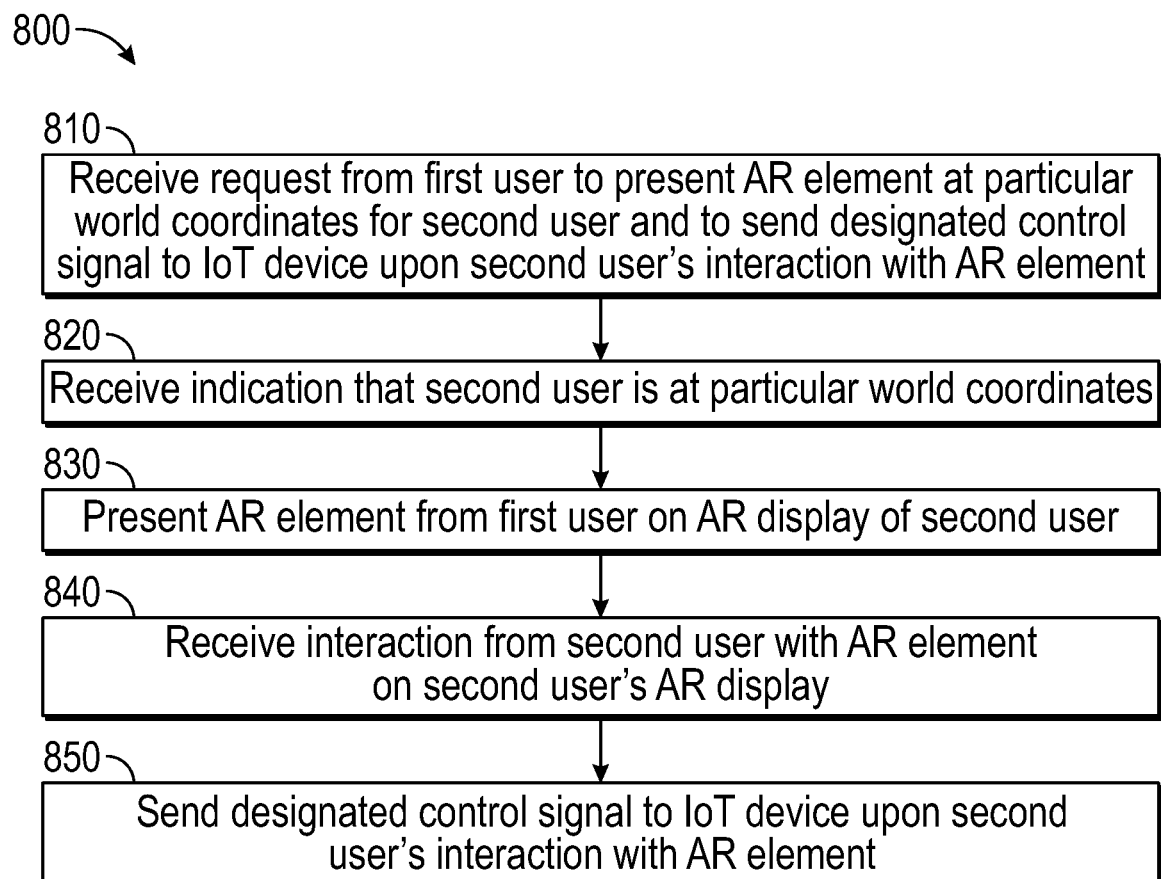
FIG. 8 illustrates a flow chart of a method implemented by the backend server for enabling a user to provide an AR object to another user for controlling a real-world IoT device through interaction with the AR object as in the configuration of FIG. 7.

FIG. 8 illustrates a flow chart of a method 800 implemented by the backend server 150 for enabling a user to provide an AR object to another user for controlling a real-world IoT device 160 through interaction with the AR object as in the configuration of FIG. 7. In this configuration, the backend server 150 receives at 810 a request from a first user to present an AR object (e.g., AR door 730' or AR key 740 in above example) at particular world coordinates (e.g., in front of the front door 730 of the first user's house 720) to the AR display of an AR camera device 110 of a second user (e.g., Snap camera or Spectacles™ devices available from Snap, Inc. of Santa Monica, California) for interaction by the second user to generate a designated control signal to a particular IoT device 160 upon such interaction. Upon receipt of an indication that the second user is at the designated world coordinates at 820, the AR object from the first user is presented at 830 on an AR display of the AR camera device 110 of the second user. Upon receipt of an interaction signal indicating that the second user has interacted with the AR object in the second user's AR display at 840 (such interaction including walking through an AR door, opening an AR door with an AR key, or placing or removing a virtual ball into a virtual box in the above examples), the designated control signal is sent to the corresponding IoT device at 850 to selectively control the corresponding IoT device 160 (e.g., door 730). As in above examples, the control signal may be modified by context signals provided by the context server(s) 170.

Sharing Permissions for IoT Device

Figure 9:
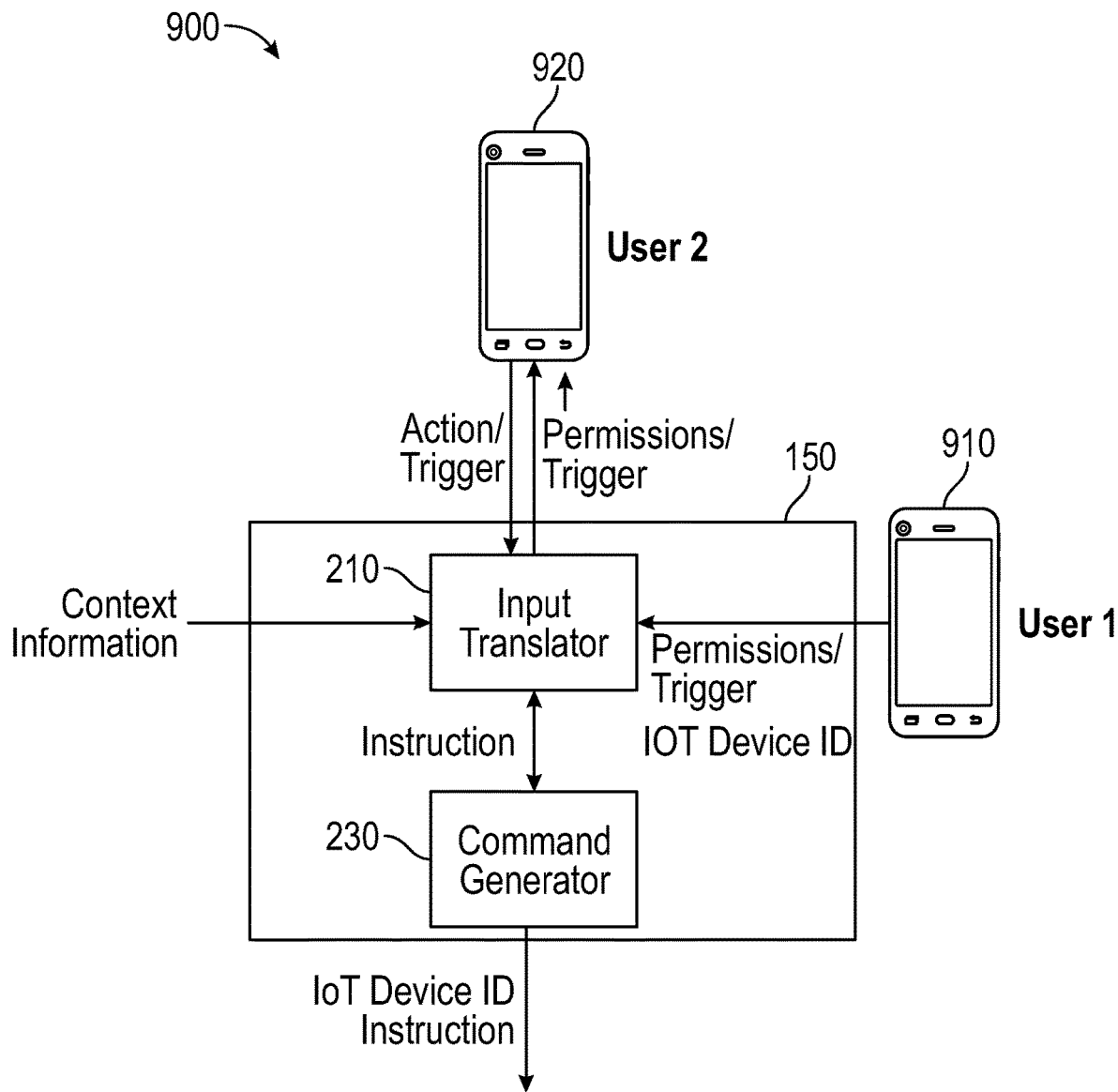
FIG. 9 illustrates a system for enabling a user to provide permissions and optional triggers to another user for providing control of a real-world IoT device in a sample configuration.

FIG. 9 illustrates a system 900 for enabling a user to provide permissions and optional triggers to another user for providing control of a real-world IoT device 160 in a sample configuration. In this configuration, it is assumed that a first user has completed the pairing process for the IoT device setup as described above with respect to FIG. 3. In this example, the first user can share permissions for her IoT devices 160 with another user (e.g., a friend in the messaging app). The shared permissions allow a friend or group specified by the first user to access one of more of the first user's IoT enabled devices 160 for some specified amount of time. In the configuration of FIG. 9, the first user interacts with a messaging app on the AR camera device 910 to select another user or group to receive permissions and optional triggers for operating specified IoT enabled devices 160 of the first user. The backend server 150 passes the permissions and trigger data to the AR camera device 920 of the second user. Then, when the second user performs the associated action or initiates the designated trigger, a message is sent to the backend server 150 to generate the corresponding instruction to the designated IoT device 160 of the first user.

As an example, if a second user is house-sitting for a first user, the first user may give the second user permission to control the first user's IoT enable smart home devices such as a smart lock and a thermostat through AR hand-motion controls recognized by the second user's AR camera device 920.

In the case of triggered access, the first user may set a type of trigger (or combination of triggers) for a specific friend or group that would cause a change in state of an IoT enabled device 160. In this case, the friend or group may confirm that they allow the first user to set up the trigger for privacy reasons (some triggers may include location or other sensitive information).

As an example, a second user may be picking up a first user in the evening. The first user may set a location trigger to have her smart lights change to blue at 20% brightness once the second user arrives at her location. Thus, the second user's AR camera device 920 is given the necessary permissions to control the IoT enabled lights at the first user's home upon arrival.

Figure 10:
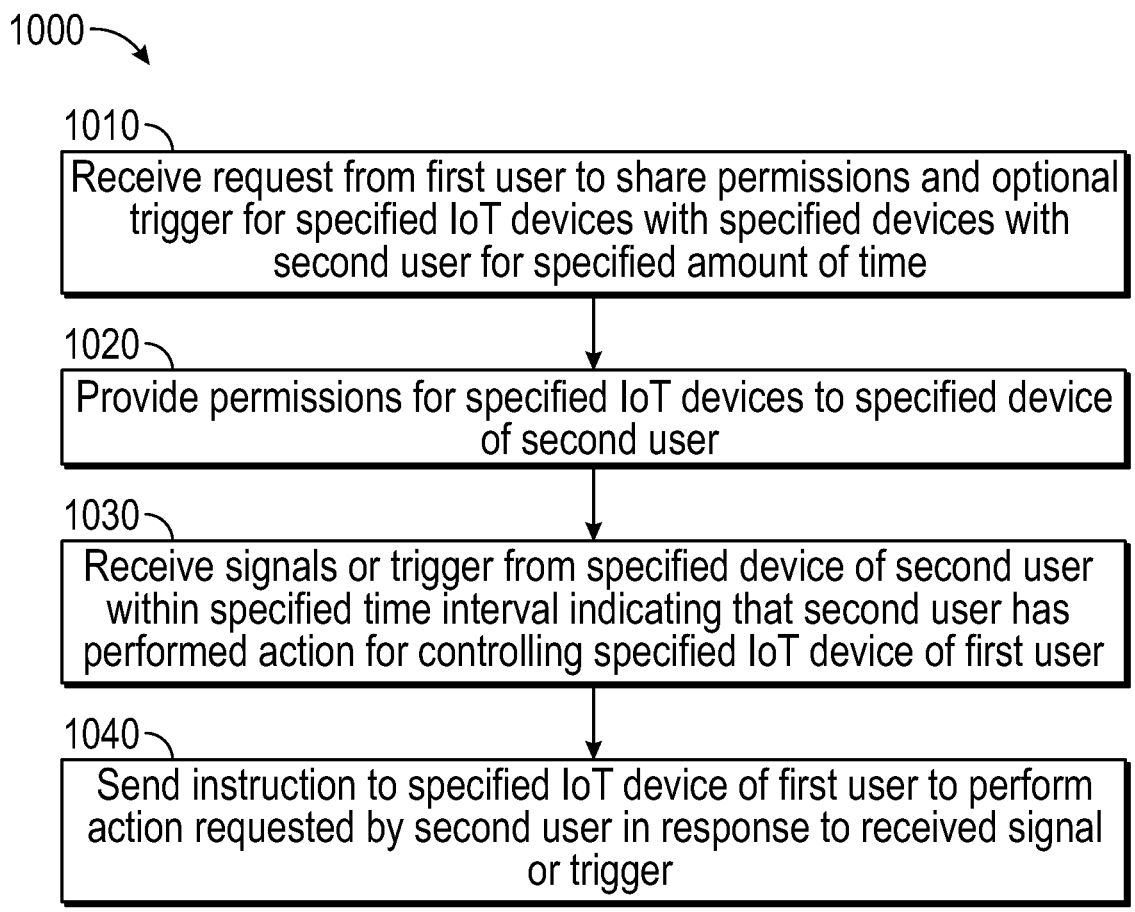
FIG. 10 illustrates a flow chart of a method implemented by the backend server for enabling a user to provide permissions and optional triggers to another user for controlling a real-world IoT device in the configuration of FIG. 9.

FIG. 10 illustrates a flow chart of a method 1000 implemented by the backend server 150 for enabling a user to provide permissions and optional triggers to another user for controlling a real-world IoT device 160 in the configuration of FIG. 9. As illustrated, at 1010 the backend server 150 receives a request from the first user to share permissions with a second user for a specified amount of time, as well as one or more optional triggers for specified IoT devices 160. The permissions for the specified IoT devices 160 are provided to an AR camera device 920 of the second user at 1020 to enable access to the specified IoT devices 160 by the second user. Then, upon receipt of signals or one or more triggers from the AR camera device 920 of the second user within a specified time interval indicating that the second user has performed the necessary action(s) for controlling the specified IoT device 160 of the first user at 1030, the backend server 150 sends instructions to the specified IoT device of the first user at 1040 to perform any action requested by the second user in response to the received signal or one or more triggers.

Two-Way Control of IoT Devices Using AR Camera

Figure 11:
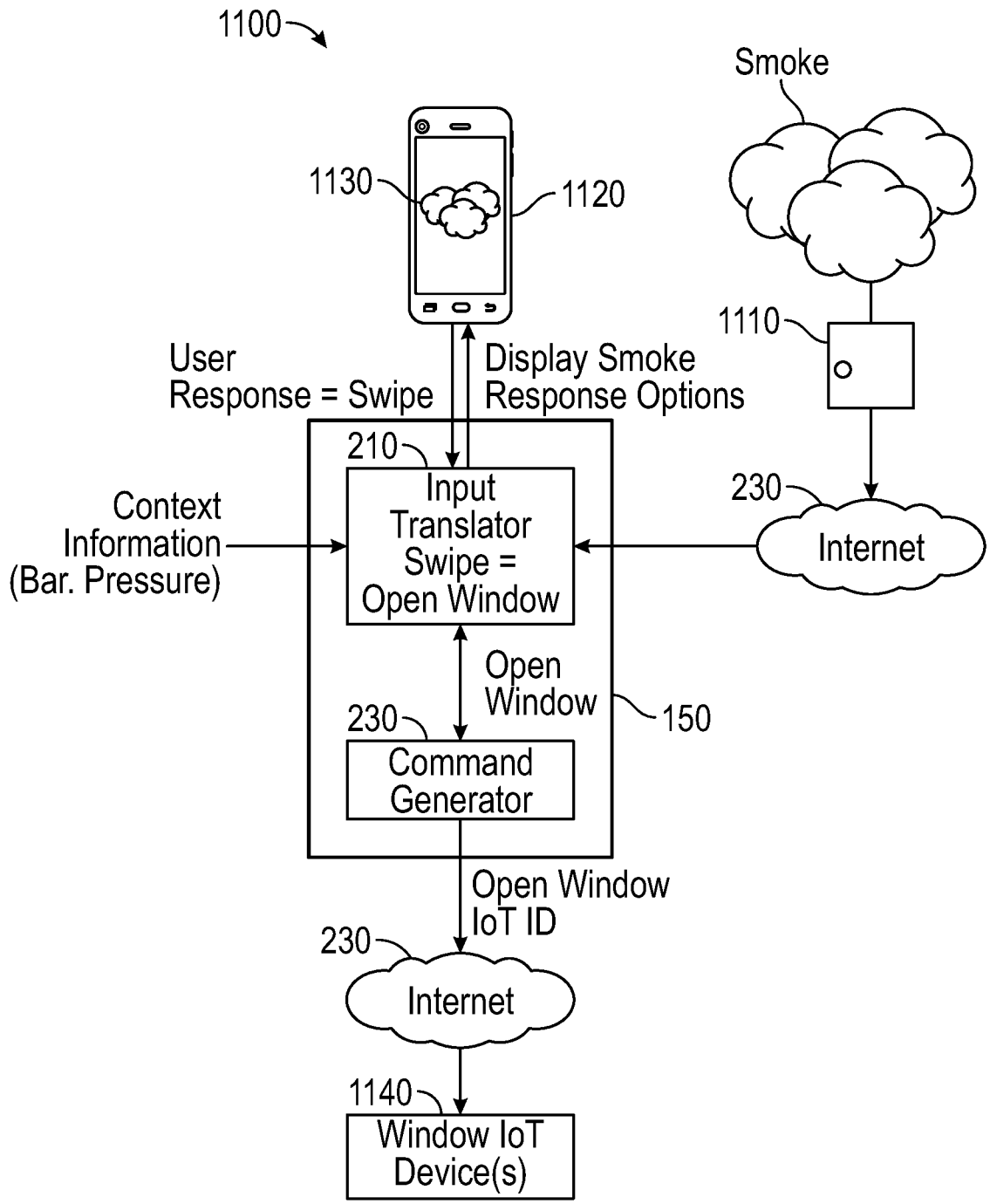
FIG. 11 illustrates a system for providing two-way interactions between IoT devices and a display of an AR camera device in a sample configuration.

FIG. 11 illustrates a system 1100 for providing two-way interactions between IoT devices 160 and an AR display of an AR camera device 1120 in a sample configuration. In this example, an IoT device such as a smoke detector 1110 provides a signal indicating that smoke has been detected. The smoke signal is provided over an internet connection 230 to the backend server 150. Upon detection of the smoke signal, the backend server 150 sends an AR smoke overlay 1130 to the display of the AR camera device 1120 paired with the IoT device 1110. The display including AR smoke overlay 1130 also may include one or more of text or an image explaining response options to the user of the AR camera device 1120. For example, the at least one text or image may indicate that the user should swipe the AR smoke overlay 1130 to open a window or to activate another IoT enabled device 160 in the vicinity of the smoke detector 1110. The user's response is provided to the backend server 150, and the input translator 210 determines from the swipe response that the user wishes to open an IoT enabled window 1140 in the vicinity of the smoke detector 1110. Upon identification of the IoT enabled window 1140 in the IoT device memory 220, the appropriate command signal to open the window is sent over an internet connection 230 to the IoT enabled window device 1140.

In this case, the IoT sensor 1110 provides an input to the system. The received data from the IoT sensor 1110 causes one or more virtual objects 1130 to be displayed on the user's AR camera device 1120 (e.g., Snap Camera, Snapchat app, Spectacles, etc.) that are indicative of the signal received from the IoT sensor 1110. The user then interacts with the one or more virtual objects 1130 to change the state of the IoT device 1110 that sent the detection signal or another IoT device (e.g., window IoT device 1140) in response to the detection signal.

In this example, an air quality monitor or IoT enabled smoke detector 1110 may detect smoke or high levels of pollutants inside the user's home. A cloudy-gray AR image may be overlayed on the AR display of the user's AR camera device 1120 or the user's electronic eyewear device. The user may swipe or gesture to push away the AR clouds, which triggers one or more IoT enabled windows 1140 in the user's house to open.

Figure 12:
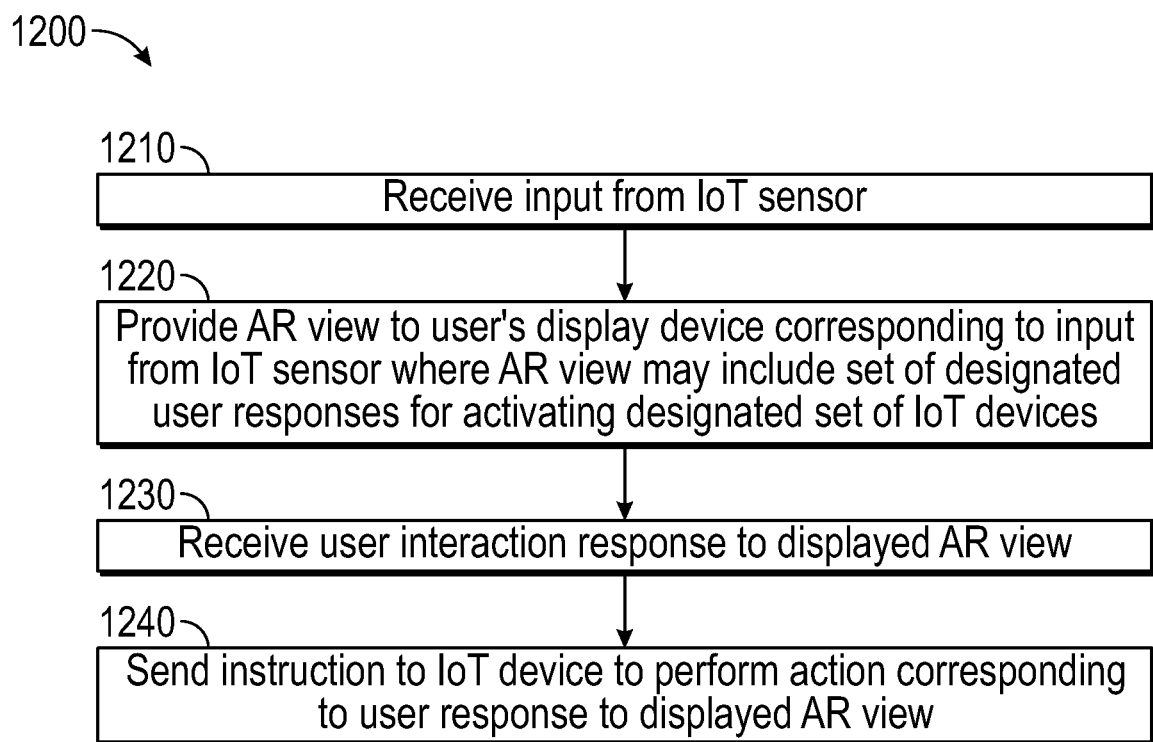
FIG. 12 illustrates a flow chart of a method implemented by the backend server for providing two-way interactions between IoT devices and a display of an AR camera device in the configuration of FIG. 11.

FIG. 12 illustrates a flow chart of a method 1200 implemented by the backend server 150 for providing two-way interactions between IoT devices 160 and an AR display of the user's AR camera device 1120 in the configuration of FIG. 11. As indicated, the backend server 150 receives input from the IoT sensor (e.g., smoke detector 1110) at 1210. In response, the backend server 150 provides at 1220 an AR image overlay to the AR display of the AR display of the paired AR camera device 1120. The AR image overlay corresponds to the signal from the IoT sensor (e.g., smoke in the case of a smoke indication from a smoke detector) and may further include a set of designated user responses for activating a designated set of IoT devices 160. In the example of FIG. 11, the designated user responses may include a swipe indicating that the user wishes to open one or more IoT enabled windows 1140. The user's interaction response to the displayed AR image is received by the backend server 150 at 1230, and instructions are generated and sent at 1240 to the one or more IoT devices (e.g., IoT enabled windows 1140) to perform the action corresponding to the user response to the displayed AR image (e.g., open the windows in response to a user swipe of the AR display).

Building AR Experiences with IoT Devices

Figure 13:
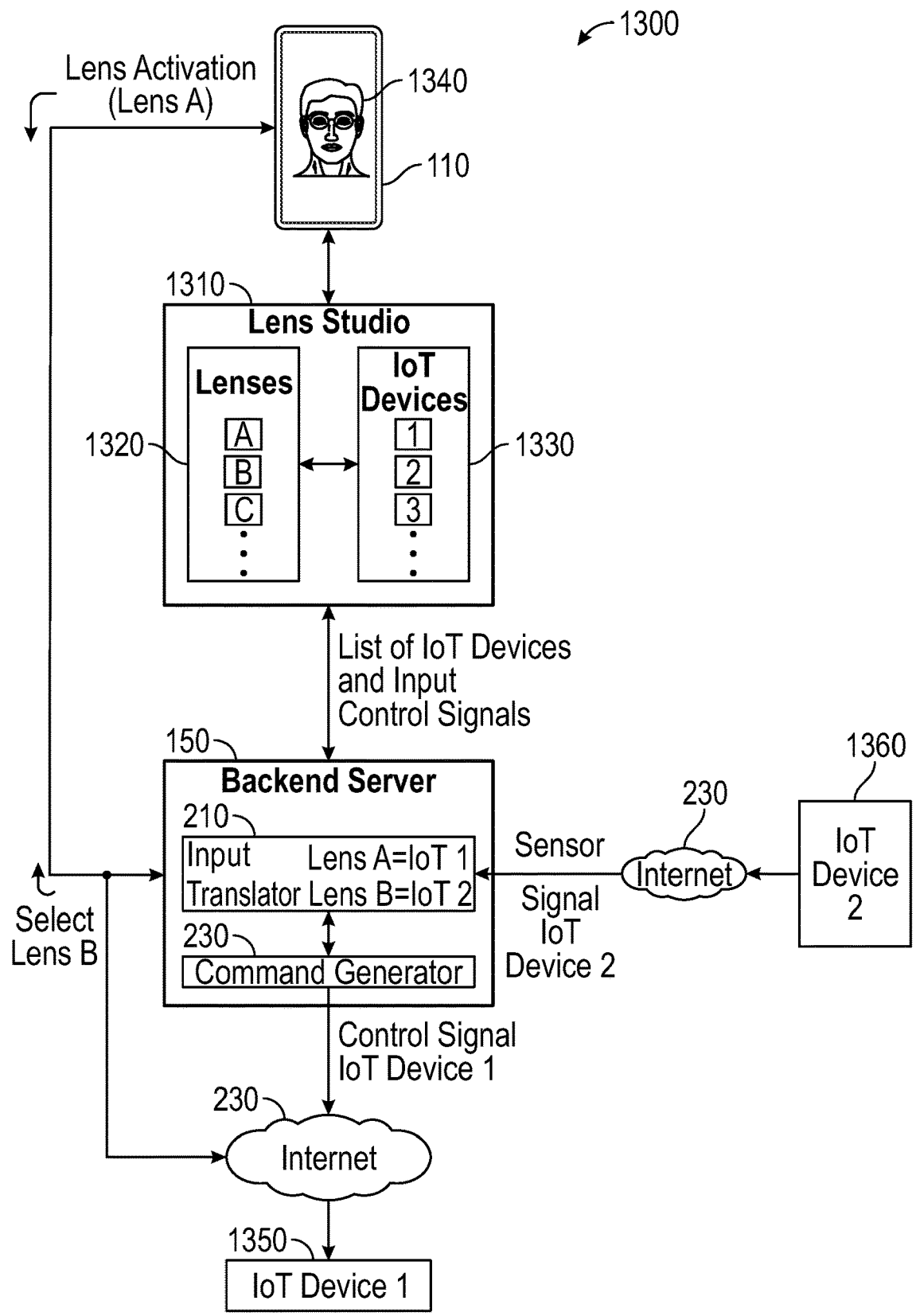
FIG. 13 illustrates a system for relating AR lenses to IoT devices using AR software for building augmented reality experiences in a sample configuration.

FIG. 13 illustrates a system 1300 for relating AR lenses 1320 to IoT devices 1330 using AR software 1310 for building augmented reality experiences in a sample configuration. In this example, a service is provided to that would permit developers to develop AR lenses 1320 to control IoT devices 1330 in their environment and to permit IoT devices 1330 to provide inputs for selection of AR lenses 1320 for display on the AR display of the user's AR camera device 110.

As illustrated in FIG. 13, AR software 1310 for building AR experiences (e.g., Lens Studio by Snap, Inc. of Santa Monica, California) is provided that lists available lenses 1320 as well as available IoT devices 1330 that may be controlled by the user via the user's AR camera device 110.

The user may select lenses 1320 for controlling selected IoT devices 1330 and may select IoT devices 1330 for selecting lenses 1320 in sample configurations. During use of the AR camera device 110, activation of a displayed lens (A) 1340 may cause a control signal to be provided to the backend server 150 to control the IoT device(s) 1350 paired with the selected lens 1340 by the user. This control signal may be provided directly to the IoT device 1350 by the AR camera device 110 or may be determined by input translator 210, which may maintain a list of lenses 1320 and IoT devices 1330 controlled by the respective lenses 1320. Upon activation of the lens 1340, the corresponding control signal is forwarded to the corresponding IoT device 1350 via an internet connection 230 directly or via backend server 150.

As an example, an AR object such as a spinner on the display of the AR camera device 110 may be paired with an IoT controlled ceiling fan. As the user increases the spinning rate of the spinner on the display of the AR camera device 110, the speed of the ceiling fan may be correspondingly increased. Conversely, the speed of the ceiling fan may control the rate of activity of an AR object on the display of the AR camera device 110. For example, as the speed of the ceiling fan is increased, the speed of an AR windmill on the display of the AR camera device 110 may be correspondingly increased.

Similarly, an IoT device 1360 may provide a sensor signal via an internet connection 230 to the backend server 150, where input translator 210 identifies the corresponding lens 1320. The backend server 150 then sends a control signal to at least one of the AR software 1310 or the user's AR camera device 110 to select the lens (B) 1320 that has been paired with the IoT device 1360 that provided the sensor signal.

Figure 14:
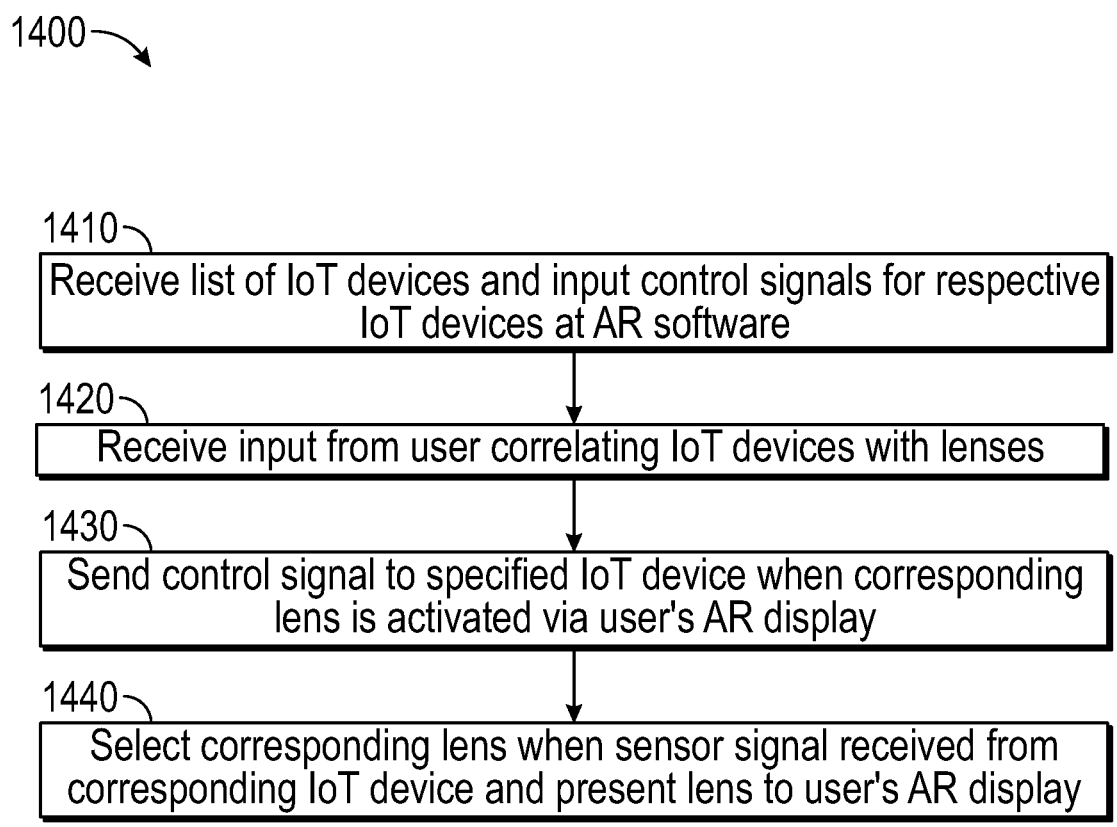
FIG. 14 illustrates a flow chart of a method implemented by the AR camera device and AR software for selecting lenses using an IoT device and for controlling an IoT device using a lens in the configuration of FIG. 13.

FIG. 14 illustrates a flow chart of a method 1400 implemented by the AR camera device 110 and AR software 1310 for selecting lenses using an IoT device 160 and controlling an IoT device 1330 using a lens 1320 in the configuration of FIG. 13. As illustrated, the AR software 1310 (e.g., Lens Studio) receives a list of IoT devices 1330 and input control signals at 1410 for the respective IoT devices 1330 to be paired with lenses 1320. At 1420, the user provides input to the AR software 1310 for correlating the IoT devices 1330 to lenses 1320 when creating an AR experience. Then, when a lens 1320 paired with an IoT device 1330 is activated via the user's AR display, a control signal is sent at 1430 to the paired IoT device 1330 either directly or via the backend server 150. Conversely, when a sensor signal is received from an IoT device 1330 by the backend server 150, a selection signal may be sent to the AR camera device 110 for selection of the lens 1320 paired with the IoT device 1330 that provided the sensor signal. The selected lens 1320 is then presented to the user's AR display at 1440. As in the example above, the sensor signal could be a signal from an IoT enabled smoke detector that is paired with a lens that presents AR smoke to the AR display of the AR camera device 110.

It will be appreciated by those skilled in the art that any of the configurations presented above may be modified by the context information received from the context server(s) 170 described with respect to FIG. 1. Such context information enables a multimodal interaction with the IoT devices. For example, when a user takes an action with her AR camera device 110 that causes an IoT device state change, some other data source may provide additional context information as input to the system. Such additional context sources 170 may include (but are not limited to):

Weather data
Location data (country, city, etc.)
Current day is a holiday?
Current Internet download speed
etc.

The context information received by the system may cause some virtual objects to be displayed on the user's AR camera device 110. For example, a specific image marker may be detected by the AR camera device 110 that triggers the lights in the room to change to a specific color and a smart speaker to play music based on the city that the user is in as determined from GPS coordinate data provided as the context information.

System Configuration

Figure 15:
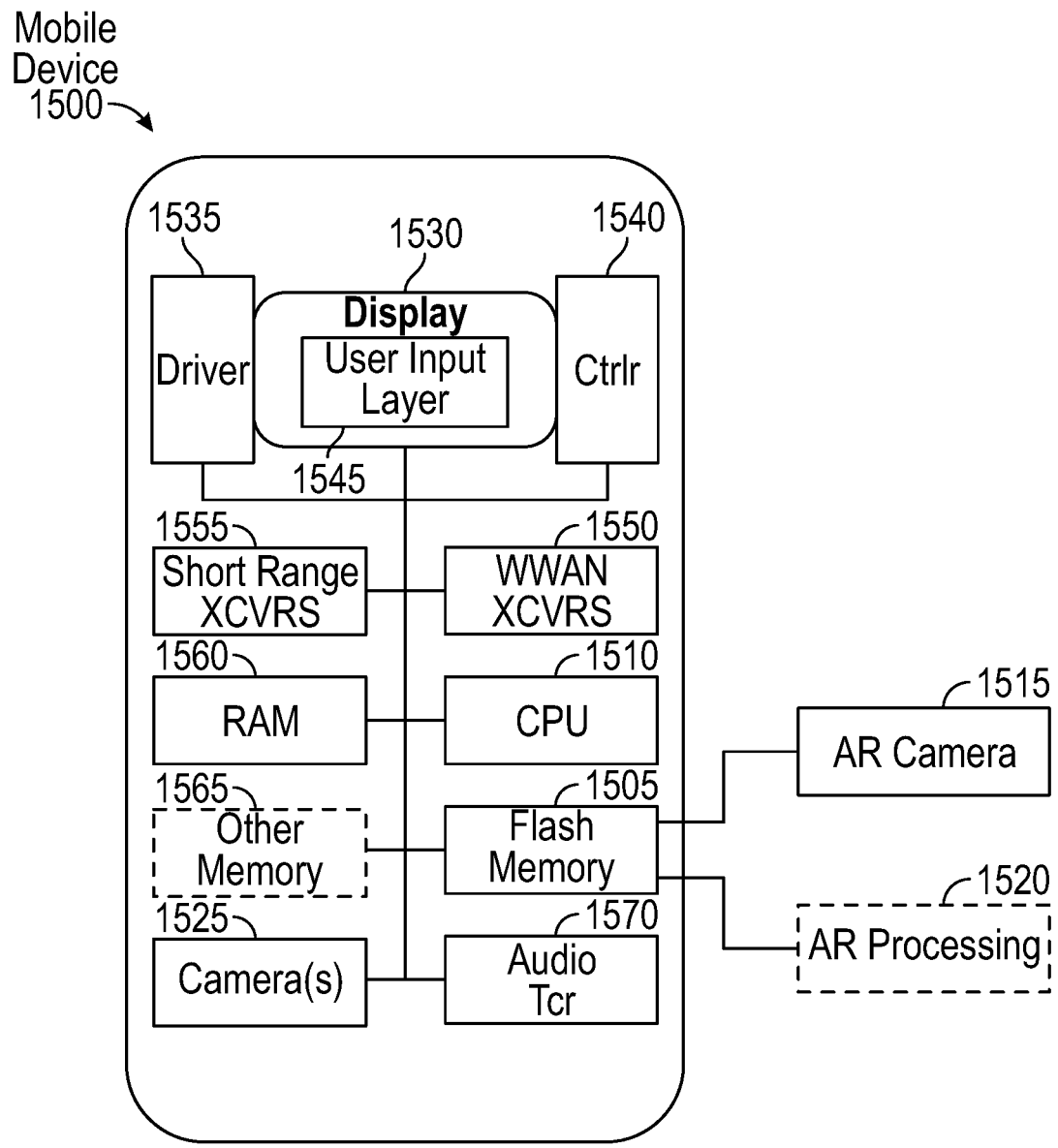
FIG. 15 illustrates a sample configuration of a mobile phone adapted to operate as an AR camera device in sample configurations.

FIG. 15 illustrates a sample configuration of a mobile device 1500 adapted to interface an AR camera device with IoT devices in sample configurations. In particular, FIG. 15 is a high-level functional block diagram of an example mobile device 1500 that a user may use as the AR camera devices described herein. Mobile device 1500 may include a flash memory 1505 that stores programming to be executed by the CPU 1510 to perform all or a subset of the functions described herein. For example, the flash memory may store AR camera software 1515 and optionally may contain AR processing software 1520 for execution by CPU 1510 to enable the user of the mobile device 1500 to display and interact with AR objects presented by the AR camera device 110 as described herein. The mobile device 1500 may further include a camera 1525 that comprises one or more visible-light cameras (first and second visible-light cameras with overlapping fields of view) or at least one visible-light camera and a depth sensor with substantially overlapping fields of view. Flash memory 1505 may further include multiple images or video, which are generated via the camera 1525.

The mobile device 1500 may further include an image display 1530, a mobile display driver 1535 to control the image display 1530, and a display controller 1540. In the example of FIG. 15, the image display 1530 may include a user input layer 1545 (e.g., a touchscreen) that is layered on top of or otherwise integrated into the screen used by the image display 1530. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 15 therefore provides a block diagram illustration of the example mobile device 1500 with a user interface that includes a touchscreen input layer 1545 for receiving input (by touch, multi-touch, or gesture, and the like, by hand, stylus, or other tool) and an image display 1530 for displaying content.

As shown in FIG. 15, the mobile device 1500 includes at least one digital transceiver (XCVR) 1550, shown as WWAN XCVRs, for digital wireless communications via a wide-area wireless mobile communication network. The mobile device 1500 also may include additional digital or analog transceivers, such as short-range transceivers (XCVRs) 1555 for short-range network communication, such as via NFC, VLC, DECT, ZigBee, Bluetooth™, or WI-FI®. For example, short range XCVRs 1555 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 1500, the mobile device 1500 also may include a global positioning system (GPS) receiver. Alternatively, or additionally, the mobile device 1500 may utilize either or both the short range XCVRs 1555 and WWAN XCVRs 1550 for generating location coordinates for positioning. For example, cellular network, WI-FI®, or Bluetooth™ based positioning systems may generate very accurate location coordinates, particularly when used in combination. Such location coordinates may be transmitted to the mobile device 1500 over one or more network connections via XCVRs 1550, 1555.

The transceivers 1550, 1555 (i.e., the network communication interface) may conform to one or more of the various digital wireless communication standards utilized by modern mobile networks. Examples of WWAN transceivers 1550 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 1550, 1555 provide two-way wireless communication of information including digitized audio signals, still image and video signals, web page information for display as well as web-related inputs, and various types of mobile message communications to/from the mobile device 1500.

The mobile device 1500 may further include a microprocessor that functions as the central processing unit (CPU) 1510. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 1510. The CPU 1510, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 1510 or processor hardware in smartphone, laptop computer, and tablet.

The CPU 1510 serves as a programmable host controller for the mobile device 1500 by configuring the mobile device 1500 to perform various operations, for example, in accordance with instructions or programming executable by CPU 1510. For example, such operations may include various general operations of the mobile device 1500, as well as operations related to the programming for messaging apps and AR camera applications on the mobile device 1500. Although a processor may be configured by use of hardwired logic, typical processors in mobile devices are general processing circuits configured by execution of programming.

The mobile device 1500 further includes a memory or storage system, for storing programming and data. In the example shown in FIG. 15, the memory system may include flash memory 1505, a random-access memory (RAM) 1560, and other memory components 1565, as needed. The RAM 1560 may serve as short-term storage for instructions and data being handled by the CPU 1510, e.g., as a working data processing memory. The flash memory 1505 typically provides longer-term storage.

Hence, in the example of mobile device 1500, the flash memory 1505 may be used to store programming or instructions for execution by the CPU 1510. Depending on the type of device, the mobile device 1500 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 1500 may include an audio transceiver 1570 that may receive audio signals from the environment via a microphone (not shown) and provide audio output via a speaker (not shown). Audio signals may be coupled with video signals and other messages by a messaging application or social media application implemented on the mobile device 1500. Also, as noted above, the audio signals may include verbal commands from the user in relation to the IoT devices (e.g., "turn ON lamp").

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 16:
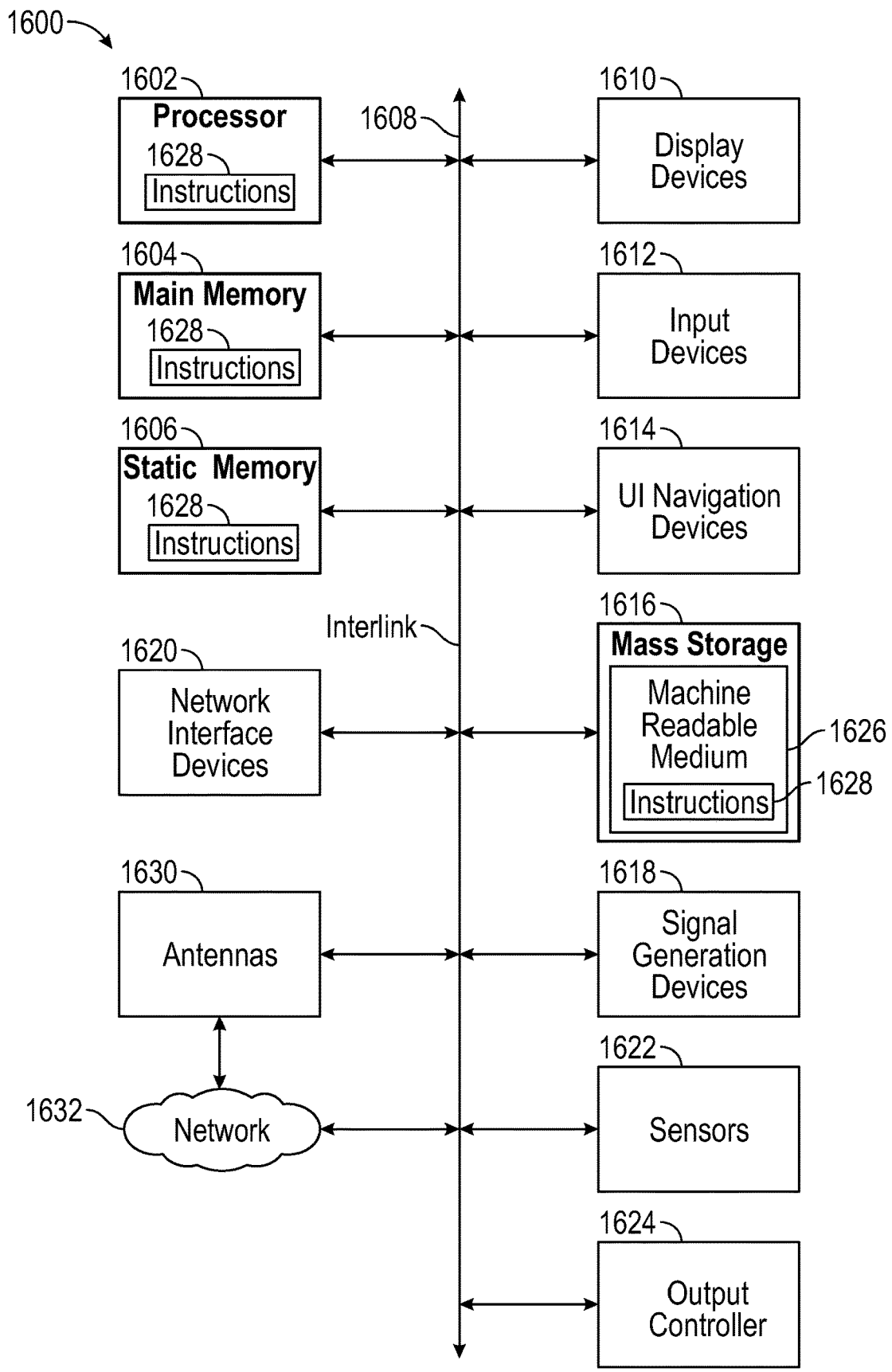
FIG. 16 illustrates a sample configuration of a computer system adapted to implement the backend server systems and methods described herein.

FIG. 16 illustrates a sample configuration of a computer system adapted to implement the systems and methods described herein. In particular, FIG. 16 illustrates a block diagram of an example of a machine 1600 upon which one or more configurations of the AR camera device 110, AR processing 140, backend server 150, and context servers 170 may be implemented. In alternative configurations, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in peer-to-peer (P2P) (or other distributed) network environment. In sample configurations, the machine 1600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1600 may serve as a workstation, a front-end server, or a back-end server of a communication system. Machine 1600 may implement the methods described herein by running the software used to implement the features for controlling IoT devices as described herein. Further, while only a single machine 1600 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1600 may include a hardware processor 1602 (e.g., a central processing unit (CPU), a graphics processing unit (GPU), a hardware processor core, or any combination thereof), a main memory 1604 and a static memory 1606, some or all of which may communicate with each other via an interlink (e.g., bus) 1608. The machine 1600 may further include a display unit 1610 (shown as a video display), an alphanumeric input device 1612 (e.g., a keyboard), and a user interface (UI) navigation device 1614 (e.g., a mouse). In an example, the display unit 1610, input device 1612 and UI navigation device 1614 may be a touch screen display. The machine 1600 may additionally include a mass storage device (e.g., drive unit) 1616, a signal generation device 1618 (e.g., a speaker), a network interface device 1620, and one or more sensors 1622. Example sensors 1622 include one or more of a global positioning system (GPS) sensor, compass, accelerometer, temperature, light, camera, video camera, sensors of physical states or positions, pressure sensors, fingerprint sensors, retina scanners, or other sensors. The machine 1600 also may include an output controller 1624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1616 may include a machine readable medium 1626 on which is stored one or more sets of data structures or instructions 1628 (e.g., software) embodying or utilized by any one or more of the techniques or functions described herein. The instructions 1628 may also reside, completely or at least partially, within the main memory 1604, within static memory 1606, or within the hardware processor 1602 during execution thereof by the machine 1600. In an example, one or any combination of the hardware processor 1602, the main memory 1604, the static memory 1606, or the mass storage device 1616 may constitute machine readable media.

While the machine readable medium 1626 is illustrated as a single medium, the term "machine readable medium" may include a single medium or multiple media (e.g., at least one of a centralized or distributed database, or associated caches and servers) configured to store the one or more instructions 1628. The term "machine readable medium" may include any medium that is capable of storing, encoding, or carrying instructions for execution by the machine 1600 and that cause the machine 1600 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1628 may further be transmitted or received over communications network 1632 using a transmission medium via the network interface device 1620. The machine 1600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1620 may include one or more physical jacks (e.g., Ethernet, coaxial, or phone jacks) or one or more antennas 1630 to connect to the communications network 1632. In an example, the network interface device 1620 may include a plurality of antennas 1630 to wirelessly communicate using at least one of single-input multiple-output (SIMO), multiple-input multiple-output (MIMO), or multiple-input single-output (MISO) techniques. In some examples, the network interface device 1620 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure.

This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of controlling an Internet of Things (IoT) device through interaction with an augmented reality (AR) object, comprising:
   receiving from a first AR camera device at least one AR object and particular world coordinates associated with the at least one AR object;
   pairing the at least one AR object with at least one IoT device;
   receiving a request from the first AR camera device to present the at least one AR object to a display of a second AR camera device specified by the first AR camera device only once the second AR camera device has arrived at the particular world coordinates;
   tracking a position of the second AR camera device in world coordinates;
   receiving an indication that the second AR camera device has arrived at the particular world coordinates;
   presenting the at least one AR object on the display of the second AR camera device upon receipt of the indication that the second AR camera device has arrived at the particular world coordinates;
   receiving an interaction signal indicating that the at least one AR object on the display of the second AR camera device has been interacted with; and
   sending a control signal to the at least one IoT device paired with the at least one AR object in response to the interaction signal.

2. The method as in claim 1, wherein the at least one AR object comprises at least one of an AR key or an AR door that is presented on the display of the second AR camera device once the second AR camera device arrives at the particular world coordinates, wherein the interaction signal is generated when the second AR camera device passes through the AR door or a user of the second AR camera device touches the AR key, and wherein the IoT device unlocks a door upon receipt of the control signal.

3. The method as in claim 1, further comprising receiving a specific action to be completed with respect to the at least one AR object before the control signal may be generated, and wherein the interaction signal comprises an indication that the specific action with respect to the at least one AR object has been completed on the second AR camera device.

4. The method as in claim 3, wherein receiving the interaction signal indicating that the AR object has been interacted with on the display of the second AR camera device includes receiving an indication that a user of the second AR camera device has completed designated game activities in a game having a virtual environment including the at least one AR object, wherein the control signal is sent to the at least one IoT device as a reward for successful completion of the designated game activities.

5. The method as in claim 1, wherein presenting the at least one AR object on the display of the second AR camera device comprises overlaying the at least one AR object on the display of the second AR camera device.

6. The method as in claim 1, further comprising:
   receiving context information relating to at least one of the at least one AR object or the at least one IoT device; and
   modifying the control signal in response to the context information.

7. The method of claim 1, further comprising matching the interaction signal with the control signal to be sent to the at least one IoT device.

8. The method of claim 1, wherein pairing at least one AR object to the at least one IoT device comprises receiving identification information for an IoT device selected through a user interface of the first AR camera device.

9. A system that controls an Internet of Things (IoT) device through interaction with an augmented reality (AR) object, comprising:
   a first AR camera device that provides at least one AR object and particular world coordinates associated with the at least one AR object and provides a request to present the at least one AR object to a display of a specified second AR camera device only once the second AR camera device has arrived at the particular world coordinates;
   the second AR camera device having a display, a position of the second AR camera device being trackable in world coordinates;
   pairing means for pairing the at least one AR object with the IoT device;
   an input translator that receives the request from the first AR camera device to present the at least one AR object to the display of the second AR camera device only once the second AR camera device has arrived at the particular world coordinates, tracks a position of the second AR camera device in world coordinates, receives an indication that the second AR camera device has arrived at the particular world coordinates, presents the at least one AR object on the display of the second AR camera device upon receipt of the indication that the second AR camera device has arrived at the particular world coordinates, and receives an interaction signal indicating that a user of the second AR camera device has interacted with the at least one AR object on the display of the second AR camera device; and
   a command generator that generates and sends a control signal to the IoT device paired with the at least one AR object in response to the interaction signal.

10. The system as in claim 9, wherein the at least one AR object comprises at least one of an AR key or an AR door that is presented on the display of the second AR camera device once the second AR camera device arrives at the particular world coordinates, wherein the interaction signal is generated by the input translator when the second AR camera device passes through the AR door or a user of the second AR camera device touches the AR key, and wherein, upon receipt of the interaction signal, the command generator sends an open door command to the IoT device to unlock a door.

11. The system as in claim 9, wherein the input translator receives a specific action to be completed with respect to the at least one AR object before the control signal may be generated, and wherein the interaction signal comprises an indication that the specific action with respect to the at least one AR object has been completed on the second AR camera device.

12. The system as in claim 11, wherein the input translator receives an indication that a user of the second AR camera device has completed designated game activities in a game having a virtual environment including the at least one AR object, and wherein the control signal is sent to the IoT device as a reward for successful completion of the designated game activities.

13. The system as in claim 9, wherein the input translator presents the at least one AR object on the display of the second AR camera device as an overlay of the at least one AR object on the display of the second AR camera device.

14. The system as in claim 9, wherein the input translator further receives context information relating to at least one of the at least one AR object or the IoT device and modifies the control signal in response to the context information.

15. The system of claim 9, wherein the input translator matches the interaction signal with the control signal to be sent to the IoT device.

16. The system of claim 9, wherein the pairing means pairs the at least one AR object to the IoT device in response to identification information for the IoT device selected through a user interface of the first AR camera device.

17. A non-transitory computer readable medium having stored thereon instructions, wherein execution of the instructions by one or more processors cause the one or more processors to control an Internet of Things (IoT) device through interaction with an augmented reality (AR) object by performing operations including:
- receiving from a first AR camera device at least one AR object and particular world coordinates associated with the at least one AR object;
- pairing the at least one AR object with at least one IoT device;
- receiving a request from the first AR camera device to present the at least one AR object to a display of a second AR camera device specified by the first AR camera device only once the second AR camera device has arrived at the particular world coordinates;
- tracking a position of the second AR camera device in world coordinates;
- receiving an indication that the second AR camera device has arrived at the particular world coordinates;
- presenting the at least one AR object on the display of the second AR camera device upon receipt of the indication that the second AR camera device has arrived at the particular world coordinates;
- receiving an interaction signal indicating that the at least one AR object on the display of the second AR camera device has been interacted with; and
- sending a control signal to the at least one IoT device paired with the at least one AR object in response to the interaction signal.

* * * * *